United States Patent
Yasuda et al.

(10) Patent No.: US 12,457,824 B2
(45) Date of Patent: Oct. 28, 2025

(54) INFRARED OPTICAL DEVICE

(71) Applicant: Asahi Kasei Microdevices Corporation, Tokyo (JP)

(72) Inventors: Daiki Yasuda, Tokyo (JP); Hiromi Fujita, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 436 days.

(21) Appl. No.: 18/186,190

(22) Filed: Mar. 20, 2023

(65) Prior Publication Data

US 2023/0307570 A1    Sep. 28, 2023

(30) Foreign Application Priority Data

Mar. 28, 2022 (JP) .................... 2022-052084
Feb. 27, 2023 (JP) .................... 2023-028926

(51) Int. Cl.
*H10F 77/40*    (2025.01)
*H10F 77/124*   (2025.01)

(52) U.S. Cl.
CPC ....... *H10F 77/413* (2025.01); *H10F 77/1248* (2025.01)

(58) Field of Classification Search
CPC .................... H10F 77/1248; H10F 77/413
See application file for complete search history.

(56) References Cited

U.S. PATENT DOCUMENTS

| | | | |
|---|---|---|---|
| 5,249,195 A * | 9/1993 | Feldman | H01S 3/0627 372/45.01 |
| 5,363,398 A * | 11/1994 | Glass | H01S 3/0635 372/45.01 |
| 6,810,053 B1 * | 10/2004 | Botez | H01S 5/187 372/45.01 |
| 2007/0034852 A1 | 2/2007 | Nelson | |
| 2009/0278163 A1 | 11/2009 | Sakamoto et al. | |
| 2011/0073973 A1 | 3/2011 | Nakaji et al. | |

(Continued)

FOREIGN PATENT DOCUMENTS

| | | | |
|---|---|---|---|
| EP | 1511137 | * | 3/2005 |
| JP | 2007103613 A | | 4/2007 |
| JP | 2009505420 A | | 2/2009 |

(Continued)

*Primary Examiner* — Matthew L Reames
(74) *Attorney, Agent, or Firm* — KENJA IP LAW PC

(57) ABSTRACT

Provided is an infrared optical device that is easy to produce and has high performance. The infrared optical device having a peak at a center wavelength $\lambda$ includes: a semiconductor substrate; and a thin film laminate portion including a first reflecting layer, an active layer, a p-type semiconductor layer, and a first electrode layer formed on the semiconductor substrate in stated order. The first reflecting layer and the p-type semiconductor layer are directly connected to the active layer. The first reflecting layer is constructed through layering of a low-refractive-index layer that is an n-type semiconductor layer and a high-refractive-index layer. The low-refractive-index layer is placed closest to the active layer in the first reflecting layer. The active layer and the p-type semiconductor layer each have a higher refractive index than the low-refractive-index layer. The center wavelength $\lambda$ is 7 µm or more at room temperature.

15 Claims, 20 Drawing Sheets

(56) References Cited

U.S. PATENT DOCUMENTS

2017/0345958 A1 11/2017 Meyer et al.
2023/0134457 A1* 5/2023 Fujita ................ H10F 77/1248
                                                257/189

FOREIGN PATENT DOCUMENTS

| JP | 2011071252 A | 4/2011 |
| JP | 2014179427 A | 9/2014 |
| JP | 2016050833 A | 4/2016 |

* cited by examiner

FIG. 9
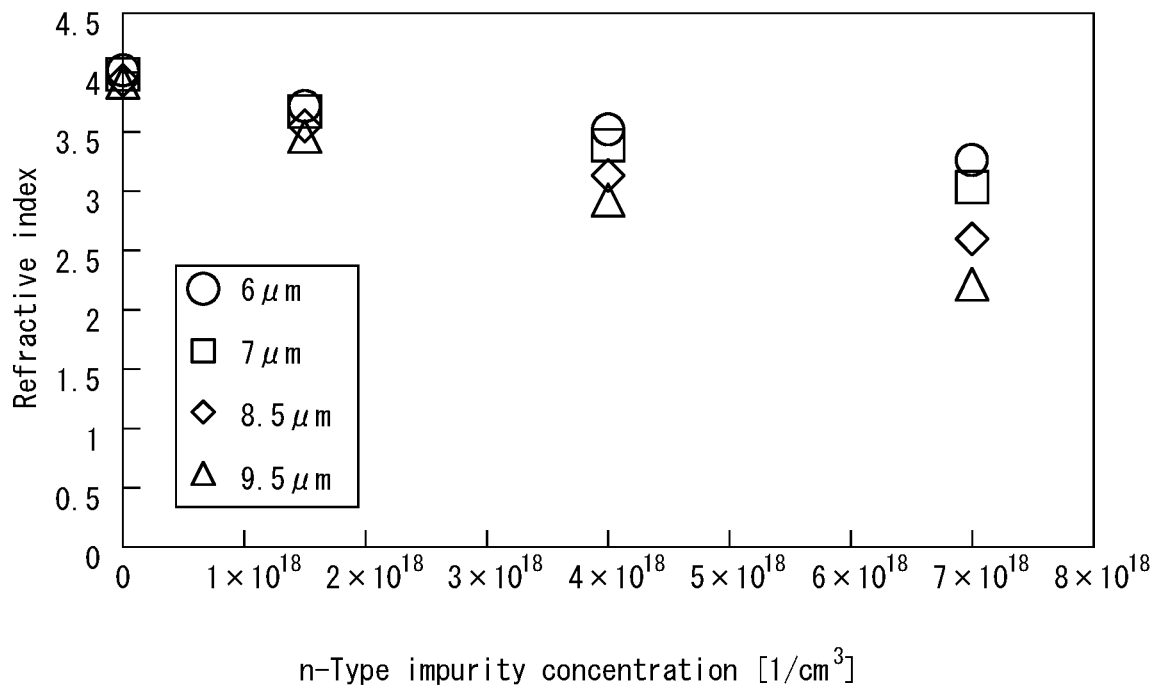
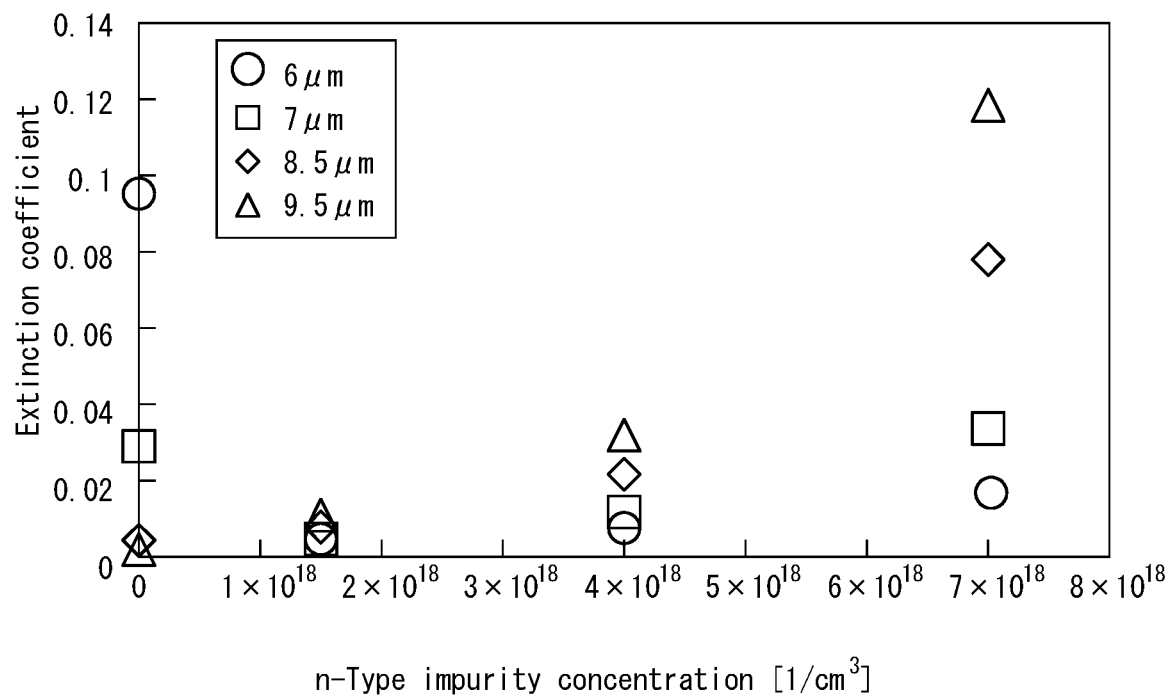

INFRARED OPTICAL DEVICE

CROSS-REFERENCE TO RELATED APPLICATIONS

This application claims priority of Japanese Patent Application No. 2022-052084 (filed Mar. 28, 2022) and Japanese Patent Application No. 2023-028926 (filed Feb. 27, 2023), the entire contents of which are incorporated herein by reference.

TECHNICAL FIELD

The present disclosure relates to an infrared optical device.

BACKGROUND

Infrared light in the short-wavelength, mid-wavelength, and long-wavelength infrared region (referred to as the mid-infrared region) having a wavelength of approximately 2 µm to 15 µm, in particular, is used in non-dispersive infrared gas concentration measurement devices due to gas molecules exhibiting characteristic absorption bands for such infrared light. In particular, infrared optical devices are important members that significantly influence key aspects of performance, such as detection resolution and power consumption, in gas concentration measurement instruments, and there is demand for infrared optical devices having high light emission intensity or light reception sensitivity at desired wavelengths. The term "optical device" as used here refers to a light-emitting element or a light-receiving element. A light-emitting diode (LED) may, for example, be used as a light-emitting element. Moreover, a photodiode (PD) may, for example, be used as a light-receiving element. Such infrared optical devices in which semiconductors are used can be caused to emit or receive light in a desired wavelength band through material design and are used in gas concentration measurement instruments.

Known techniques for enhancing the performance of such infrared optical devices include a method of adopting a resonant structure. For example, a known technique of improving light emission efficiency at a specific wavelength in the near-infrared region through a resonance effect involves sandwiching a light-emitting region from above and below through reflecting mirrors for which GaAs/AlGaAs is used (Patent Literature (PTL) 1). These reflecting mirrors are also referred to as distributed Bragg reflectors (DBRs) and are formed by layering a high-refractive-index thin film and a low-refractive-index thin film having a film thickness of approximately ¼ of the desired wavelength so as to exhibit high reflectance at the desired wavelength. A technique of using InAs/GaSb as a mirror material, for example, has also been disclosed for the mid-infrared region (PTL 2). A method of enhancing the sensitivity of light receiving elements such as photodiodes by using the same resonance effect is also known. An LED such as described above may be referred to as an RC-LED. Moreover, a PD such as described above may be referred to as an RC-PD. In the following description, an RC-LED and an RC-PD may be referred to collectively using the term "RC-LED/PD".

CITATION LIST

Patent Literature

PTL 1: JP 2007-103613 A
PTL 2: JP 2009-505420 A

SUMMARY

A feature of an RC-LED/PD such as described above is that a thin active layer is positioned at an antinode of an electric field inside a resonator and that DBRs having high reflectance are used as reflecting mirrors. However, particularly in the case of an RC-LED/PD for a mid-infrared long-wavelength region in which the wavelength is 7 µm or more, the film thickness of DBRs becomes extremely large, cost increases, and processing becomes difficult. Accordingly, one solution that may be considered is to use a metal mirror as one reflecting mirror and to make the reflecting mirror and an electrode layer a shared structure. However, the fact that reflectance cannot be increased as much with a metal mirror as with a DBR is problematic. Moreover, there are instances in which an n-type semiconductor layer included in a reflecting layer displays absorption at a desired wavelength in the mid-infrared long-wavelength region. Consequently, in the case of a mid-infrared long-wavelength region RC-LED/PD, absorption loss when light is repeatedly reflected at the top and bottom of a resonator is a significant problem.

Furthermore, since relaxation due to Auger recombination has a high tendency to occur inside a light-emitting layer of a mid-infrared long-wavelength region LED, when a thin light-emitting layer that is characteristic of a typical RC-LED is adopted, light emission is weak, and a low characteristic is obtained even though there is improvement of light emission efficiency through a resonance effect.

In light of the situation set forth above, an object of the present disclosure is to provide an infrared optical device that is easy to produce and that has high performance with suppressed ab sorption loss in a mid-infrared long-wavelength region.

(1) An infrared optical device according to an embodiment of the present disclosure has a light emission/reception characteristic having a peak at a center wavelength $\lambda$, the infrared optical device comprising:
   a semiconductor substrate; and
   a thin film laminate portion including a first reflecting layer, an active layer, a p-type semiconductor layer, and a first electrode layer formed on the semiconductor substrate in stated order, wherein
   the first reflecting layer and the p-type semiconductor layer are directly connected to the active layer,
   the first reflecting layer is constructed through layering of a low-refractive-index layer that is an n-type semiconductor layer and a high-refractive-index layer having a higher refractive index than the low-refractive-index layer,
   the low-refractive-index layer is placed closest to the active layer in the first reflecting layer,
   the active layer and the p-type semiconductor layer each have a higher refractive index than the low-refractive-index layer, and
   the center wavelength $\lambda$ is 7 µm or more at room temperature.

(2) As an embodiment of the present disclosure, in the foregoing (1), the active layer is formed of InAsSb, where $0 \leq As < 0.5$.

(3) As an embodiment of the present disclosure, in the foregoing (1) or (2), the active layer has a film thickness of not less than 1 µm and not more than 3 µm.

(4) As an embodiment of the present disclosure, in any one of the foregoing (1) to (3), the first reflecting layer includes a plurality of layers formed of AlGaInAsSb, where 0≤Al+Ga≤0.5 and 0≤As≤0.5, and having different impurity concentrations.

(5) As an embodiment of the present disclosure, in the foregoing (4), the low-refractive-index layer includes an n-type semiconductor layer having an impurity concentration of $3.0 \times 10^{18}/cm^3$ or more.

(6) As an embodiment of the present disclosure, in the foregoing (4) or (5), the first reflecting layer is a laminate of not fewer than 2 layers and not more than 6 layers.

(7) As an embodiment of the present disclosure, in any one of the foregoing (4) to (6), when $n_L$ is taken to be a refractive index of the low-refractive-index layer at the center wavelength $\lambda$ and $n_H$ is taken to be a refractive index of the high-refractive-index layer at the center wavelength $\lambda$, the low-refractive-index layer has a film thickness of smaller than $\lambda/(4n_L)$ and the high-refractive-index layer has a film thickness of larger than $\lambda/(4n_H)$.

(8) As an embodiment of the present disclosure, in any one of the foregoing (4) to (7), at least a portion of the low-refractive-index layer has a smaller film thickness than the high-refractive-index layer.

(9) As an embodiment of the present disclosure, in any one of the foregoing (4) to (8), the thin film laminate portion further includes a second reflecting layer disposed between the semiconductor substrate and the first reflecting layer and formed of a different material from the first reflecting layer.

(10) As an embodiment of the present disclosure, in any one of the foregoing (1) to (9), when m is taken to be an integer of 1 or more and $n_c$ is taken to be an effective refractive index of a multilayered portion disposed between the first reflecting layer and the first electrode layer at the center wavelength $\lambda$, the multilayered portion has a film thickness L satisfying $\lambda(1+2m)/(4n_c) < L < \lambda(2+2m)/(4n_c)$.

(11) As an embodiment of the present disclosure, in any one of the foregoing (1) to (10), the active layer has a film thickness that is 70% or more of a film thickness of a multilayered portion disposed between the first reflecting layer and the first electrode layer.

(12) As an embodiment of the present disclosure, in any one of the foregoing (1) to (11), the thin film laminate portion includes a tunnel junction layer, and the tunnel junction layer is located intermediately in the active layer.

(13) As an embodiment of the present disclosure, in any one of the foregoing (1) to (12),
the first reflecting layer includes a first region and a second region,
the first region, the active layer, and the p-type semiconductor layer constitute a mesa structure,
the mesa structure is covered by an insulating film such that part of an upper surface of the mesa structure is open to thereby form an opening,
the first electrode layer is formed such as to cover the opening, and
when $t_i$ is taken to be a film thickness of the insulating film present between the upper surface of the mesa structure and the first electrode layer, $n_i$ is taken to be a refractive index of the insulating film at the center wavelength $\lambda$, L is taken to be a film thickness of a multilayered portion disposed between the first reflecting layer and the first electrode layer, and $n_c$ is taken to be an effective refractive index of the multilayered portion at the center wavelength $\lambda$, there is an optical film thickness relationship of $t_i n_i < 0.03 \times L n_c$.

(14) As an embodiment of the present disclosure, in the foregoing (13), the opening has an area that is 40% or more of a lower portion area of the mesa structure.

(15) As an embodiment of the present disclosure, in the foregoing (13) or (14), an n-contact region for connecting the first reflecting layer and a second electrode layer is formed on the second region, and the mesa structure is formed within a range of 50 μm from the n-contact region.

According to the present disclosure, it is possible to provide an infrared optical device that is easy to produce and has high performance with suppressed absorption loss in a mid-infrared long-wavelength region.

BRIEF DESCRIPTION OF THE DRAWINGS

In the accompanying drawings:

FIG. 9 is a diagram illustrating dependency of refractive index and extinction coefficient of an InSb layer with respect to n-type impurity concentration;

DETAILED DESCRIPTION

<Infrared Optical Device>

Figure 1:
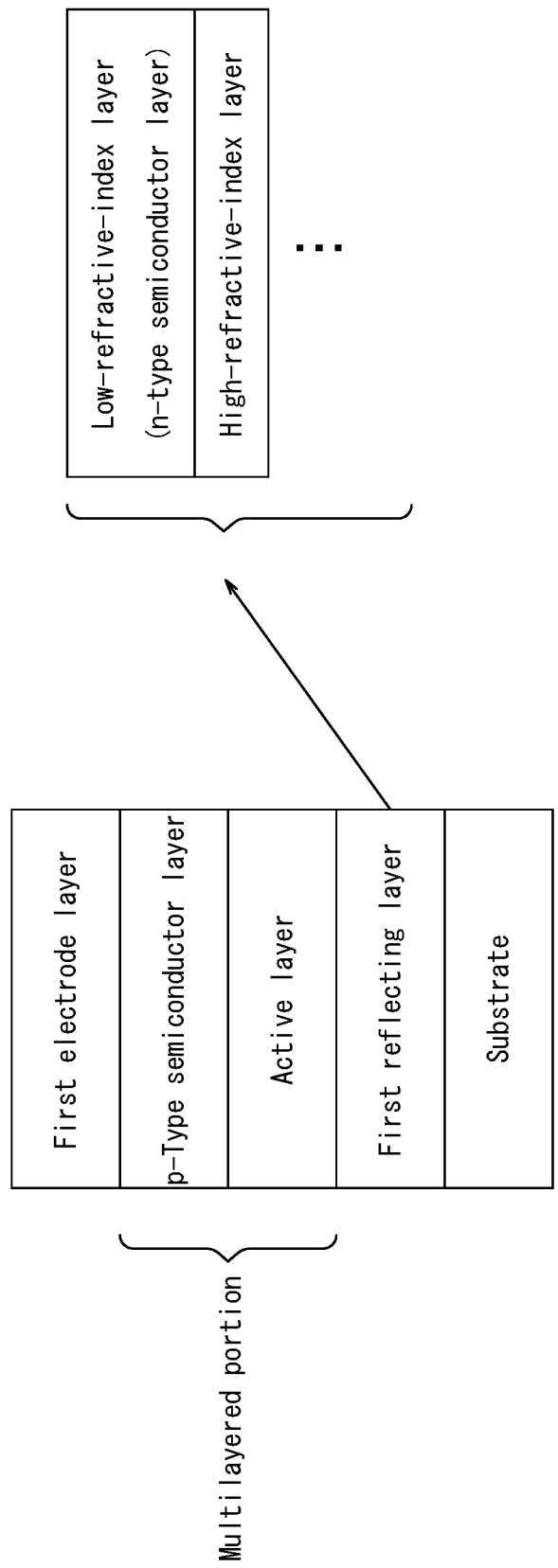
FIG. 1 is a configuration diagram of an infrared optical device according to an embodiment.

An infrared optical device according to an embodiment of the present disclosure has a light emission/reception characteristic having a peak at a center wavelength λ. The infrared optical device includes a semiconductor substrate and a thin film laminate portion.

The number of peaks may be one or may be more than one. The number and shapes of peaks can change depending on reflection and transmission characteristics of a reflecting layer and a first electrode layer and depending on the length of a subsequently described multilayered portion.

Note that the infrared optical device is an infrared light-emitting element or an infrared light-receiving element and that the term "infrared optical device" is used as a collective term for these elements. The infrared light-emitting element is implemented through the structure of the infrared optical device described below, and the infrared light-receiving element is also implemented through the same structure. Moreover, the infrared light-emitting element is produced through the production method of the infrared optical device described below, and the infrared light-receiving element is also produced through the same production method. In a case in which the infrared optical device is an infrared light-emitting element, the infrared optical device may, more specifically, be a light-emitting diode. The infrared optical device may alternatively be a vertical-cavity surface-emitting laser that emits light perpendicularly to a thin film surface. In a Fabry-Perot laser, for example, that emits light in a direction horizontal to a thin film surface, the infrared optical device may also be used for light confinement in a direction perpendicular to the thin film surface. Moreover, in a case in which the infrared optical device is an infrared light-receiving element, the infrared optical device is, more specifically, a photodiode. Furthermore, since the infrared optical device exhibits specifically high performance at the center wavelength λ, the infrared optical device can be used for energy transmission, waste heat power generation through thermal photovoltaic power, and the like.

<Semiconductor Substrate>

The infrared optical device according to the present embodiment includes a semiconductor substrate. For example, a Si substrate, an InP substrate, a GaAs substrate, or the like can be used. Moreover, an InAs substrate, a GaSb substrate, an InSb substrate, or the like is preferable as a substrate for forming an infrared optical device having few defects and high performance due to having a similar lattice constant to a material of a subsequently described active layer.

Free electron absorption by electrons or holes is significant particularly in the mid-infrared long-wavelength region, and accordingly a semiconductor substrate with a low impurity concentration (carrier concentration) is preferred. Furthermore, the use of a semi-insulating GaAs substrate can suppress such free electron absorption and can electrically insulate and isolate the thin film laminate portion that is formed on the substrate. Hence, by connecting a plurality of thin film laminate portions in series or in parallel using electrode wiring, it is possible to obtain an infrared optical device having desired electrical and optical characteristics.

<Thin Film Laminate Portion>

The infrared optical device according to the present embodiment includes a thin film laminate portion that is formed on the semiconductor substrate. The thin film laminate portion includes at least a first reflecting layer, an active layer, a p-type semiconductor layer, and a first electrode layer in stated order from the semiconductor substrate side. The first reflecting layer and the p-type semiconductor layer are directly connected to the active layer. Note that the thin film laminate portion may include an active layer that is divided into a plurality of layers, and the plurality of layers of the active layer may be directly connected via a tunnel junction layer.

<First Reflecting Layer>

The first reflecting layer is constructed through layering of a low-refractive-index layer that is an n-type semiconductor layer and a high-refractive-index layer that has a higher refractive index than the low-refractive-index layer. The low-refractive-index layer is placed closest to the active layer in the first reflecting layer. It is preferable that a constituent material of the first reflecting layer includes AlGaInAsSb (0≤Al+Ga≤0.5, 0≤As≤0.5) and that the first reflecting layer is formed of a laminate of a plurality of layers having different impurity concentrations. Note that the description in parentheses indicates composition ratios in the mixed crystal. Thus, (0≤Al+Ga≤0.5, 0≤As≤0.5) indicates that in $Al_xGa_yIn_{1-x-y}As_zSb_{1-z}$, the sum x+y of the composition ratios of Al and Ga is not less than 0 and not more than 0.5 and the composition ratio z of As is not less than 0 and not more than 0.5. Composition ratios are indicated in the same manner in the following description. In the mid-infrared region, refractive index can be widely controlled by performing impurity doping of the above described material and controlling the impurity concentration (carrier concentration). Particularly at a wavelength of 7 μm or more, it is possible to obtain a large refractive index difference through impurity concentration. The carrier concentration referred to here is determined by the impurity concentration and the activation rate.

Particularly in the case of a low-refractive-index layer, it is possible to form a thin film having a low refractive index by adopting an n-type semiconductor layer having an impurity concentration of $3.0\times10^{18}/cm^3$ or more. Moreover, in the case of a high-refractive-index layer, it is possible to form a thin film having a high refractive index by adopting at least one of a p-type semiconductor layer, an intrinsic semiconductor layer, and an n-type semiconductor layer having a lower impurity concentration than an n-type semiconductor layer serving as a low-refractive-index layer.

Examples of the impurities referred to here include Sn and Te used as n-type doping materials and Zn, Be, and Ge used as p-type doping materials. Moreover, Si may be used as an n-type doping material or a p-type doping material depending on the base semiconductor. However, impurity materials are not limited to those described above. Evaluation of impurity concentration can be performed by secondary ion mass spectrometry (SIMS), for example.

The formation of a laminate of a plurality of layers having different impurity concentrations (i.e., impurity doping concentrations) results in the formation of a laminate structure having different refractive indices. The plurality of different layers may be formed of different materials or may be formed of the same material and just have different impurity doping concentrations. By appropriately designing the film thicknesses according to the desired wavelength, it is possible to construct a distributed Bragg reflector through layering of a low-refractive-index layer and a high-refractive-index layer. The refractive index of the high-refractive-index layer is higher than the refractive index of the low-refractive-index layer. In general, when the refractive index of each layer in a distributed Bragg reflector is taken to be n, a favorable reflection characteristic can be obtained through design such that the film thickness of each layer is $\lambda/(4n)$ ($\lambda$ is the desired center wavelength).

In the case of a wavelength of 7 μm or more, an n-type semiconductor layer that is formed of AlGaInAsSb ($0 \leq Al+Ga \leq 0.5$, $0 \leq As \leq 0.5$) and that has an impurity concentration of $3.0 \times 10^{18}/cm^3$ or more can be used as the low-refractive-index layer. In this case, when an intrinsic semiconductor is used as the high-refractive-index layer, for example, a large refractive index difference between the low-refractive-index layer and the high-refractive-index layer can be obtained, but there is significant light absorption loss due to absorption of free carriers in the low-refractive-index layer. Therefore, it is preferable to deviate from design principles of a typical distributed Bragg reflector by setting the film thickness of the low-refractive-index layer as smaller than $\lambda/(4n_L)$ and setting the film thickness of the high-refractive-index layer as larger than $\lambda/(4n_H)$. Note that $n_L$ referred to here is the refractive index of the low-refractive-index layer at the center wavelength $\lambda$. Moreover, $n_H$ is the refractive index of the high-refractive-index layer at the center wavelength $\lambda$. In this case, although a reflection characteristic of the first reflecting layer deteriorates compared to a case in which the film thickness of each layer is set as $\lambda/(4n)$, it is possible to improve a light reception characteristic or a light emission characteristic in the active layer.

When design principles of a typical distributed Bragg reflector are adopted, the film thickness of a low-refractive-index layer is larger than the film thickness of a high-refractive-index layer. In the present embodiment, it is more preferable that at least a portion of the low-refractive-index layer has a smaller film thickness than the high-refractive-index layer from a viewpoint of reducing light absorption loss in the low-refractive-index layer.

The low-refractive-index layer and the high-refractive-index layer may each be formed of a laminate of two or more layers differing in terms of material or impurity concentration. For example, in a case in which a given low-refractive-index layer is formed of an a-layer and a b-layer, the a-layer and the b-layer are counted together as one constituent layer of the first reflecting layer. Moreover, when the film thickness and the refractive index at the center wavelength $\lambda$ of the a-layer are taken to be $t_a$ and $n_a$, respectively, and the film thickness and the refractive index at the center wavelength $\lambda$ of the b-layer are taken to be $t_b$ and $n_b$, respectively, the effective refractive index $n_L$ of this low-refractive-index layer is expressed by $n_L=(n_a t_a+n_b t_b)/(t_a+t_b)$. The film thickness $t_a+t_b$ is preferably smaller than $\lambda/(4n_L)$.

A low-refractive-index layer placed closest to the active layer in the first reflecting layer may be formed of a laminate of two or more layers, and one of those layers may be a wide band gap layer that functions as a barrier layer with respect to holes.

As a result of the number of layers in the first reflecting layer being 2 or more, a resonator can be formed in a region sandwiched between the first reflecting layer and the first electrode layer. Although a larger number of layers in the first reflecting layer is preferable because reflectance improves as the number of layers increases, it is possible to obtain an adequate reflection characteristic even with a small number of layers at a wavelength of 7 μm or more because a large refractive index difference can be obtained. Moreover, in view of the fact that absorption loss in the low-refractive-index layer due to free carrier absorption by doped semiconductor becomes significant when the first reflecting layer includes a large number of layers, it is preferable that the first reflecting layer is a laminate of not fewer than 2 layers and not more than 6 layers.

A thin film layer having a greatly different lattice constant may be included for purposes such as reducing thin film dislocations. For example, a semiconductor layer (thin film layer) of a composition outside the foregoing Al and Ga composition range and As composition range may be included so long as the thickness of the layer is not more than 1/10 of a value obtained by dividing the center wavelength $\lambda$ by the refractive index n of the layer. In such a case, the thin film layer having a greatly different lattice constant is not treated as the first reflecting layer and is not counted in the number of layers in the first reflecting layer.

Although a subsequently described second electrode layer is preferably electrically joined to the low-refractive-index layer that is an n-type semiconductor layer placed closest to the active layer in the first reflecting layer, the second electrode layer may be electrically joined to any layer included in the first reflecting layer, and current may flow through part of the first reflecting layer.

Refractive index measurement can be performed by spectroscopic ellipsometry, for example.

<Second Reflecting Layer>

A second reflecting layer is disposed between the semiconductor substrate and the first reflecting layer and is formed of a different material from the first reflecting layer. Moreover, the second reflecting layer is constructed through alternate layering of a low-refractive-index layer and a high-refractive-index layer. The second reflecting layer functions in conjunction with the first reflecting layer as a reflecting mirror in the present disclosure. The constituent material of the second reflecting layer may be any material that does not display absorption at a wavelength of 7 μm or more and may, for example, be GaAs/AlGaAs.

<Active Layer>

The active layer is a light-emitting layer or a light-receiving layer. InAsSb ($0 \leq As < 0.5$) is preferable as a material of the active layer that is suitable for the mid-infrared long-wavelength region. For example, by changing the composition of As from 0 to 20%, it is possible to control the light emission edge wavelength or the light reception edge wavelength from 7.3 μm to 12 μm at room temperature. Room temperature referred to here is 25° C. The light emission edge wavelength or light reception edge wavelength is a wavelength that is determined by the band gap and structure of the material of the active layer, and refers to the maximum wavelength at which light is emitted or the maximum wavelength at which light can be received. As one example, in a case in which the active layer is an InSb thin film, a wavelength of 7.3 μm that corresponds to the band gap of 0.17 eV of that InSb thin film is the light emission edge wavelength or the light reception edge wavelength.

The active layer may be an intrinsic semiconductor or may be p-type doped. Particularly in a case in which the band gap is narrow, the active layer is p-type slight doped. In one example of slight doping, impurity doping of from $10^{16}/cm^3$ to $10^{18}/cm^3$ is performed. Moreover, it is also possible for light emission or reception to occur in a layer other than the active layer, such as a p-type semiconductor layer, an n-type semiconductor layer, or the first reflecting layer. In order to suppress light emission or reception by such layers other than the active layer, it is desirable for the center wavelength λ to be at a longer wavelength than a band edge wavelength calculated from the band gap of the semiconductor layer other than the active layer.

The active layer has a higher refractive index than the low-refractive-index layer that is placed closest to the active layer in the first reflecting layer. The active layer may be a single continuous layer or may be a plurality of separate layers. For example, the active layer may be separated into a first active layer and a second active layer, and the first active layer and the second active layer may be connected through a tunnel junction layer.

<p-Type Semiconductor Layer>

InSb, AlInSb, or InAsSb may be used as the constituent material of the p-type semiconductor layer.

The p-type semiconductor layer may be formed of a plurality of layers. Moreover, the p-type semiconductor layer may include a wide band gap layer that functions as a barrier layer with respect to electrons.

The p-type semiconductor layer has a higher refractive index than the low-refractive-index layer that is placed closest to the active layer in the first reflecting layer.

<First Electrode Layer and Second Electrode Layer>

The material of each of the first electrode layer and the second electrode layer is preferably a material having high reflectance in the mid-infrared long-wavelength region and may be Au or Al, for example. Each of the first electrode layer and the second electrode layer may be a laminate of different electrode materials in order to reduce contact resistance, improve adhesion, and prevent mutual diffusion of electrode material and semiconductor material. For example, Ti, Pt, Ni, Cr, or the like can be used. The film thickness of each layer is designed so as to not hinder reflectance in the first electrode layer. The electrode material is not limited to these examples. The first electrode layer and the second electrode layer may be separate materials or may be the same material. The first electrode layer and the second electrode layer may be formed simultaneously in one process.

The first electrode layer is a metal reflecting mirror and is also provided for injection of current or extraction of current from the p-type semiconductor layer side. Electrical joining (contact) of the electrode layer and the semiconductor layer is made in the p-type semiconductor layer. The second electrode layer is provided for injection of current or extraction of current from the first reflecting layer. The second electrode layer contacts with a semiconductor layer via an n-contact region on a second region of the first reflecting layer.

<Multilayered Portion>

The active layer has a higher refractive index than the low-refractive-index layer that is placed closest to the active layer in the first reflecting layer, and thus light is reflected at the interface thereof, enabling function as a mirror. In addition, the first electrode layer functions as a metal reflecting mirror. Consequently, the p-type semiconductor layer and the active layer that are disposed between the first electrode layer and the first reflecting layer in the layering direction function as a resonator. Through such a configuration, it is possible to form an infrared optical device that has a light emission/reception characteristic having a peak at the desired center wavelength λ.

Note that another layer may be provided between the p-type semiconductor layer and the first electrode layer, and, in this case, the other layer is also part of the multilayered portion and functions as part of the resonator. For example, it is envisaged that a second n-type semiconductor layer may be provided between the p-type semiconductor layer and the first electrode layer and that the p-type semiconductor layer and the second n-type semiconductor layer may be connected by a tunnel junction. Moreover, a plurality of active layers may be connected to each other via a tunnel junction layer. In other words, a tunnel junction layer may be located intermediately in the active layer. In this case, the tunnel junction layer is part of the multilayered portion and functions as part of the resonator. In a case in which the optical device is a light-emitting element, the series connection of a plurality of active layers through a tunnel junction results in radiative recombination being performed in the plurality of active layers with respect to a certain injection current. This makes it possible to improve light emission intensity. In a case in which the optical device is a light-receiving element, the series connection of a plurality of active layers through a tunnel junction results in increased diode resistance. Increased diode resistance is preferable in connecting with an external signal processing circuit.

The first electrode layer and the first reflecting layer cause the formation of a standing wave at the center wavelength λ in the multilayered portion. In a conventional RC-LED/PD, the active layer is sandwiched between cladding layers that do not contribute directly to light emission or reception and the thickness of the cladding layers is generally adjusted such that the active layer is positioned at an antinode of an electric field of a standing wave formed in the resonator. Positioning of a light-emitting layer at an antinode where there is high electric field strength makes it possible for an RC-LED to have improved light emission efficiency at the center wavelength λ as compared to a case in which a multilayered portion does not constitute a resonator. Moreover, reducing the film thickness of the light-emitting layer in order to position the light-emitting layer at an antinode where there is high electric field strength makes it possible to reduce reabsorption in the light-emitting layer of light that has been generated in the light-emitting layer. In the case of an RC-PD, positioning of a thin light-receiving layer at an antinode where there is high electric field strength enables efficient absorption of light, and thus can improve light reception sensitivity as a compared to a case in which a multilayered portion does not constitute a resonator.

However, in the case of the mid-infrared long-wavelength region where the wavelength is 7 μm or more, there is large absorption loss other than in the active layer. Therefore, the multilayered portion in the present embodiment is formed of the p-type semiconductor layer and the active layer without the inclusion of cladding layers in order to reduce the number of reflections at the top and bottom of the multilayered portion. It is thus inevitable that the active layer has a larger film thickness then in a conventional RC-LED/PD. Such a configuration makes it possible to benefit from a resonance effect in the present embodiment while also intentionally weakening a light confinement effect and reducing reflection loss at the top and bottom of the multilayered portion, thereby enabling enhancement of a light emission/reception characteristic of the infrared optical device.

In the present embodiment, the film thickness of the active layer is preferably not less than 1 μm and not more than 3 μm, and is preferably 70% or more of the film thickness L of the multilayered portion from a viewpoint of reducing absorption loss in the p-type semiconductor layer. In a case in which the multilayered portion includes a tunnel junction layer that is located intermediately in the active layer, the total film thickness of the divided active layer is preferably not less than 1 μm and not more than 3 μm, and is preferably 70% or more of the film thickness L of the multilayered portion.

Particularly in a case in which the present embodiment is an infrared light-emitting element, relaxation through Auger recombination arising as a result of increased current density can be suppressed and adequate light emission can be achieved due to the light-emitting layer being sufficiently thick.

Light reflection at an interface of the first electrode layer and the p-type semiconductor layer is fixed end reflection. On the other hand, reflection at the first reflecting layer is free end reflection because an intrinsic or p-type InSb-based material forming the active layer has a high refractive index relative to an n-type InSb-based material. For this reason, a configuration in which the film thickness L of the multilayered portion is $L=\lambda(1+2m)/(4n_c)$ is typically adopted in a conventional RC-LED/PD in order to satisfy resonance conditions. Note that m is an integer of 1 or more, and $n_c$ is the effective refractive index of the multilayered portion at the center wavelength λ. In a case in which the multilayered portion is formed of only the active layer and the p-type semiconductor layer, the effective refractive index $n_c$ of the multilayered portion is defined by $n_c=(n_p t_p + n_a t_a)/(t_p + t_a)$, where $n_p$ and $n_a$ are the refractive indices of the p-type semiconductor layer and the active layer, respectively, and $t_p$ and $t_a$ are the film thicknesses of the p-type semiconductor layer and the active layer, respectively.

However, in the case of a typical configuration, significant absorption loss occurs in the n-type semiconductor layer that is placed closest to the active layer in the first reflecting layer because an interface of the active layer and the first reflecting layer where there is free end reflection is positioned at an antinode of the electric field.

In order to suppress absorption loss in the n-type semiconductor layer included in the first reflecting layer, it is preferable for the film thickness L of the multilayered portion to deviate from resonance conditions in order that the position of an antinode of the electric field enters into the active layer. In other words, it is preferable that $\lambda(1+2m)/(4n_c) < L < \lambda(2+2m)/(4n_c)$ is satisfied.

Moreover, it is often the case that m=1 or m=2 is adopted because increasing the film thickness L of the multilayered portion results in a smaller amplification effect of a light emission/reception characteristic through the resonance effect and also results in a larger film thickness for the semiconductor thin film structure and more difficult production.

<Mesa Structure>

A first region of the first reflecting layer, the active layer, and the p-type semiconductor layer constitute a mesa structure. The mesa structure may be formed by dry etching or by wet etching.

The mesa structure is covered by an insulating film such that part of an upper surface of the mesa structure is open to thereby form an opening. The first electrode layer is formed such as to cover the opening. The p-type semiconductor layer and the first electrode layer are in contact in the opening, thereby enabling the first electrode layer to function as a reflecting mirror in the infrared optical device of the present embodiment.

In a case in which the infrared optical device is an infrared light-receiving element, it is preferable for the area of the opening to be 40% or more of the area of a lower portion of the mesa structure in order to bring about a resonance effect for more light that is incident on the mesa structure and increase sensitivity. The aforementioned area is more preferably 60% or more. In a case in which the infrared optical device is an infrared light-emitting element, it is likewise preferable for the area of the opening to be 40% or more of the area of the lower portion of the mesa structure in order to improve light emission intensity through a resonance effect for more light emitted from the light-emitting layer in the mesa structure. The aforementioned area is more preferably 60% or more.

Through formation of the first electrode layer and the second electrode layer, a current path is formed from the first electrode layer to the second electrode layer in the layering direction of a semiconductor laminate portion inside the mesa structure and in a substrate in-plane direction inside the first reflecting layer. Since diode resistance is extremely low for a semiconductor material that has a narrow band gap with a wavelength of 7 μm or more, resistance when current flows inside the first reflecting layer in the substrate in-plane direction influences characteristics of the infrared optical device. In a case in which the infrared optical device is an infrared light-emitting element, resistance of the first reflecting layer in the substrate in-plane direction causes a current distribution in the substrate in-plane direction to arise in the light-emitting layer such that an adequate resonance effect cannot be achieved. On the other hand, in a case in which the infrared optical device is an infrared light-receiving element, resistance of the first reflecting layer in the substrate in-plane direction reduces current extraction efficiency such that photoelectric current amplified through a resonance effect cannot be adequately extracted externally from the infrared light-receiving element. Accordingly, in the infrared optical device of the present embodiment for which the center wavelength is 7 μm or more, it is more preferable that the mesa structure is formed within a range of 50 μm from the n-contact region that is formed on the second region of the first reflecting layer in order to realize a high light emission/reception characteristic. The mesa structure is more preferably formed within a range of 30 μm from the n-contact region.

In one present embodiment, the second region of the first reflecting layer, the mesa structure, the first electrode layer, and the second electrode layer constitute a unit element. In a case in which the infrared optical device is an infrared light-emitting element, a plurality of unit elements may be connected in series in order to obtain the required light emission intensity for practical use or in order to realize an appropriate drive voltage or current. In a case in which the infrared optical device is an infrared light-receiving element, a plurality of unit elements may be connected in series in order to realize a resistance value that is easy to deal with in amplification of an output signal by an amplification circuit.

<Insulating Film>

The insulating film covers the mesa structure as previously described such that part of the upper surface of the mesa structure is open. The constituent material of the insulating film may be silicon nitride, silicon oxide, aluminum oxide, or the like, but is not limited thereto. Moreover, the insulating film may be a laminate of a plurality of materials.

The first electrode layer is formed such as to cover the opening. However, there is also a region in which the first electrode layer and the insulating film overlap at the upper surface of the mesa structure in order to ensure margin for error in production. In this region, the insulating film is present in a portion sandwiched between the first reflecting layer and the first electrode layer, and thus the active layer, the p-type semiconductor layer, and the insulating film can be considered to constitute a resonator, and a light emission/reception characteristic having a peak at a position deviating from the center wavelength λ arises. However, this deviation from the center wavelength λ can be reduced by reducing the film thickness of the insulating film. As a result, it is possible to enhance the light emission/reception characteristic of the infrared optical device at the center wavelength λ. When the film thickness of the insulating film present between the upper surface of the mesa structure and the first electrode layer is taken to be $t_i$, it is preferable that an optical film thickness relationship satisfies $t_i n_i < 0.03 \times L n_c$. It is more preferable that $t_i n_i < 0.02 \times L n$. It is even more preferable that $t_i n_i < 0.01 \times L n$. Note that $n_i$ referred to here is the refractive index of the insulating film at the center wavelength λ. L is the film thickness of the multilayered portion. Moreover, $n_c$ is the effective refractive index of the multilayered portion at the center wavelength λ.

The following provides a detailed description of effects, etc. of the infrared optical device according to the present embodiment with reference to the drawings. However, it should be noted that the drawings are schematic. For example, thicknesses, lengths, and so forth differ from their actual values. Parts in the drawings that are the same or correspond are allotted the same reference signs. In description of the present embodiment, descriptions of parts that are the same or correspond may be omitted or abbreviated as appropriate.

FIG. 1 is a configuration diagram for describing an infrared optical device according to a first embodiment. As illustrated in FIG. 1, the infrared optical device according to the first embodiment includes: a semiconductor substrate; and a thin film laminate portion including, in stated order, a first reflecting layer formed on the semiconductor substrate, an active layer directly connected to the first reflecting layer, a p-type semiconductor layer directly connected to the active layer, and a first electrode layer. The active layer and the p-type semiconductor layer that are sandwiched between the first reflecting layer and the first electrode layer form a resonator. Moreover, the first reflecting layer is constructed through layering of a low-refractive-index layer that is an n-type semiconductor layer and a high-refractive-index layer that has a higher refractive index than the low-refractive-index layer. The low-refractive-index layer is placed closest to the active layer in the first reflecting layer.

Figure 2:
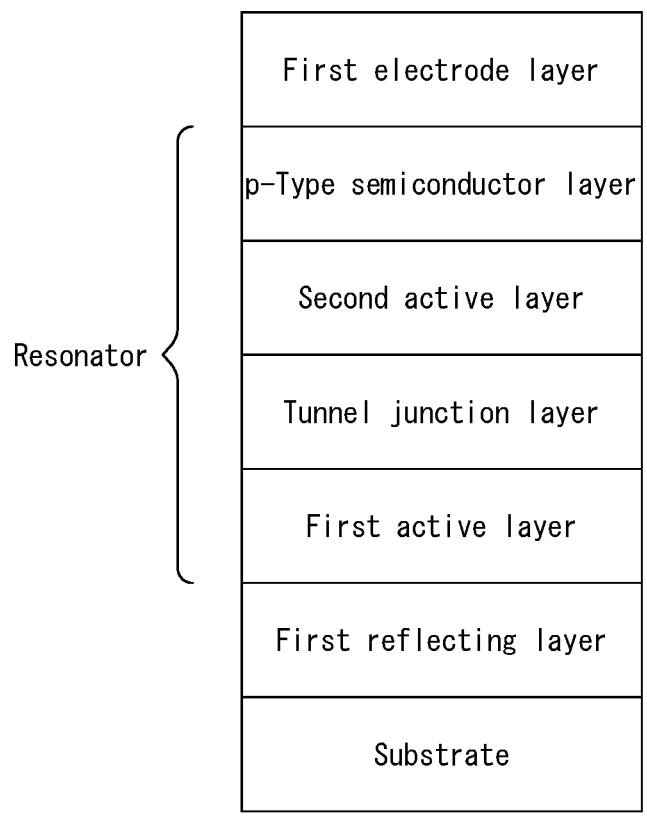
FIG. 2 is a configuration diagram of a thin film laminate portion in an infrared optical device according to an embodiment.

FIG. 2 is a configuration diagram for describing a thin film laminate portion in an infrared optical device according to a second embodiment. As illustrated in FIG. 2, the thin film laminate portion in the infrared optical device according to the second embodiment includes a semiconductor substrate, a first reflecting layer, a first active layer, a tunnel junction layer, a second active layer, a p-type semiconductor layer, and a first electrode layer in stated order. The first reflecting layer is formed on the semiconductor substrate. The first active layer is directly connected to the first reflecting layer. The tunnel junction layer is directly connected to the first active layer. The second active layer is directly connected to the tunnel junction layer. Moreover, the p-type semiconductor layer is directly connected to the second active layer. Note that the number of active layers is not limited to 2, and a plurality of active layers may be connected through a plurality of tunnel junctions.

Figure 3:
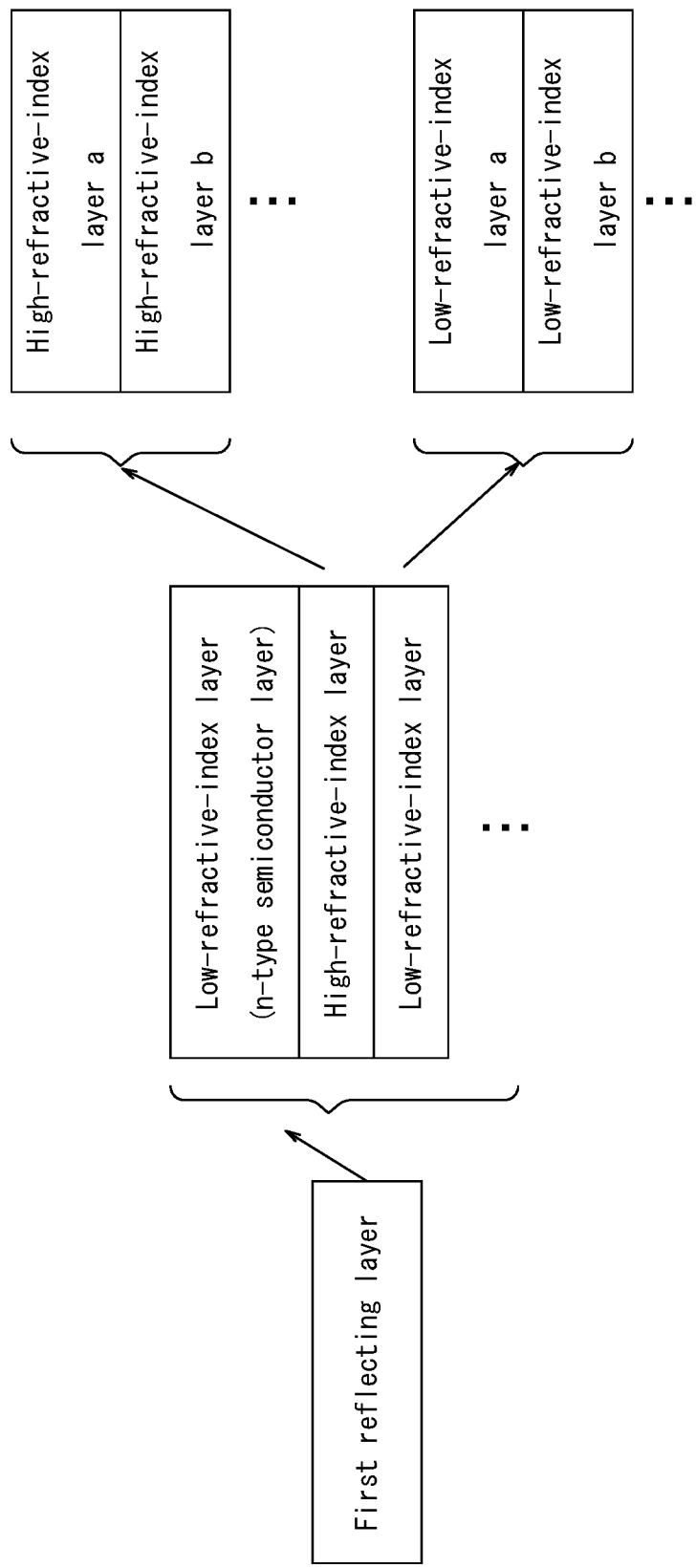
FIG. 3 is a configuration diagram of a first reflecting layer in an infrared optical device according to an embodiment.

FIG. 3 is a configuration diagram for describing the configuration of a first reflecting layer in an infrared optical device according to a third embodiment. As illustrated in FIG. 3, the first reflecting layer in the infrared optical device according to the third embodiment is formed of a laminate of a low-refractive-index layer and a high-refractive-index layer. Each of the low-refractive-index layer and the high-refractive-index layer may be formed of a plurality of layers. For example, the high-refractive-index layer can be a laminate of a plurality of high-refractive-index layers a and b having different refractive indices.

Figure 4:
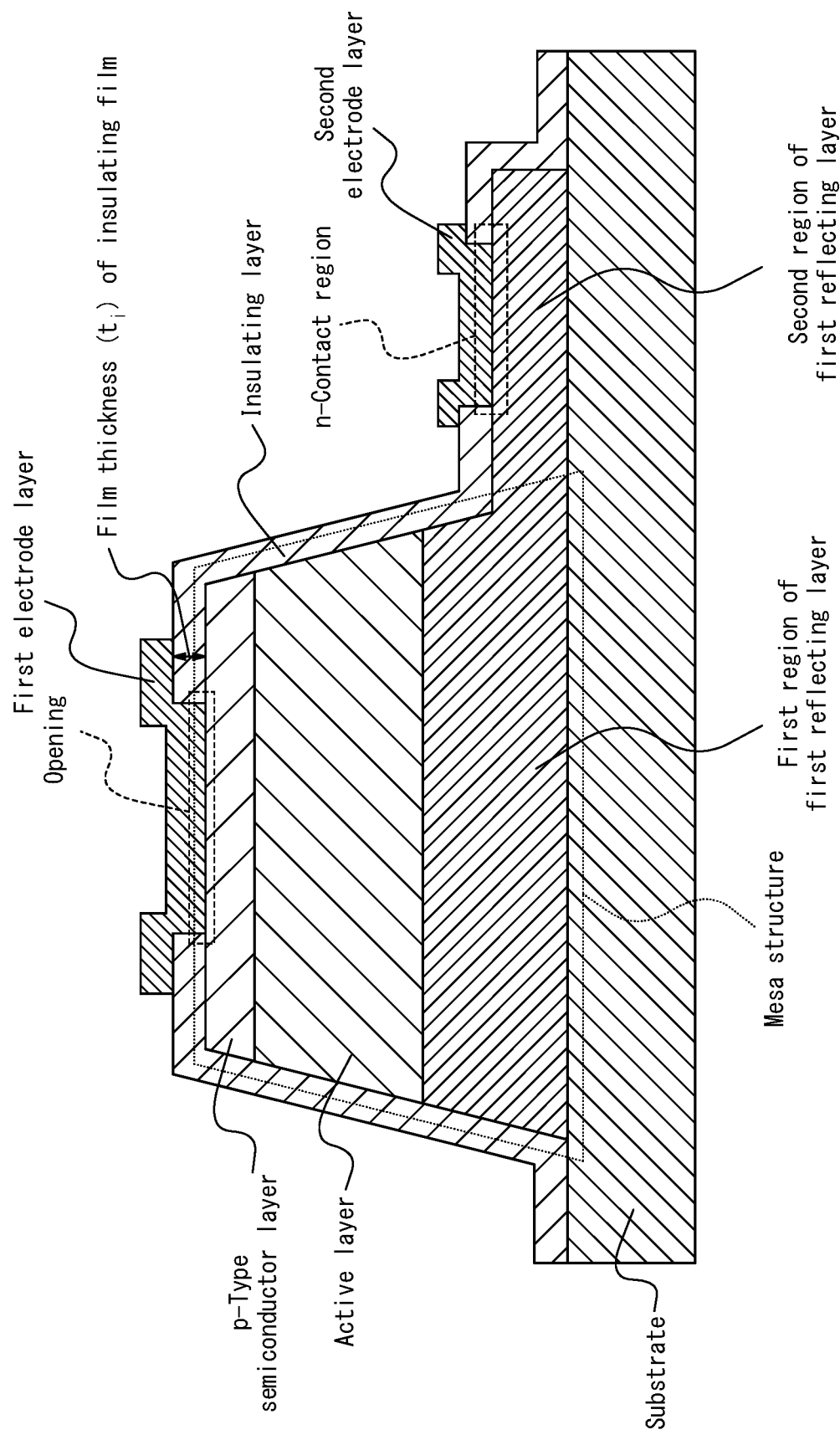
FIG. 4 is a cross-sectional diagram of an infrared optical device according to an embodiment.

FIG. 4 is a cross-sectional diagram for describing an infrared optical device according to a fourth embodiment. As illustrated in FIG. 4, the infrared optical device according to the fourth embodiment has a configuration in which a first reflecting layer includes a first region and a second region and in which the first region, an active layer, and a p-type semiconductor layer constitute a mesa structure. Moreover, the mesa structure is covered by an insulating film such that part of an upper surface of the mesa structure is open, and a first electrode layer is formed such as to cover this opening. Furthermore, an n-contact region is formed on the second region so as to connect the first reflecting layer and a second electrode layer.

Figure 5:
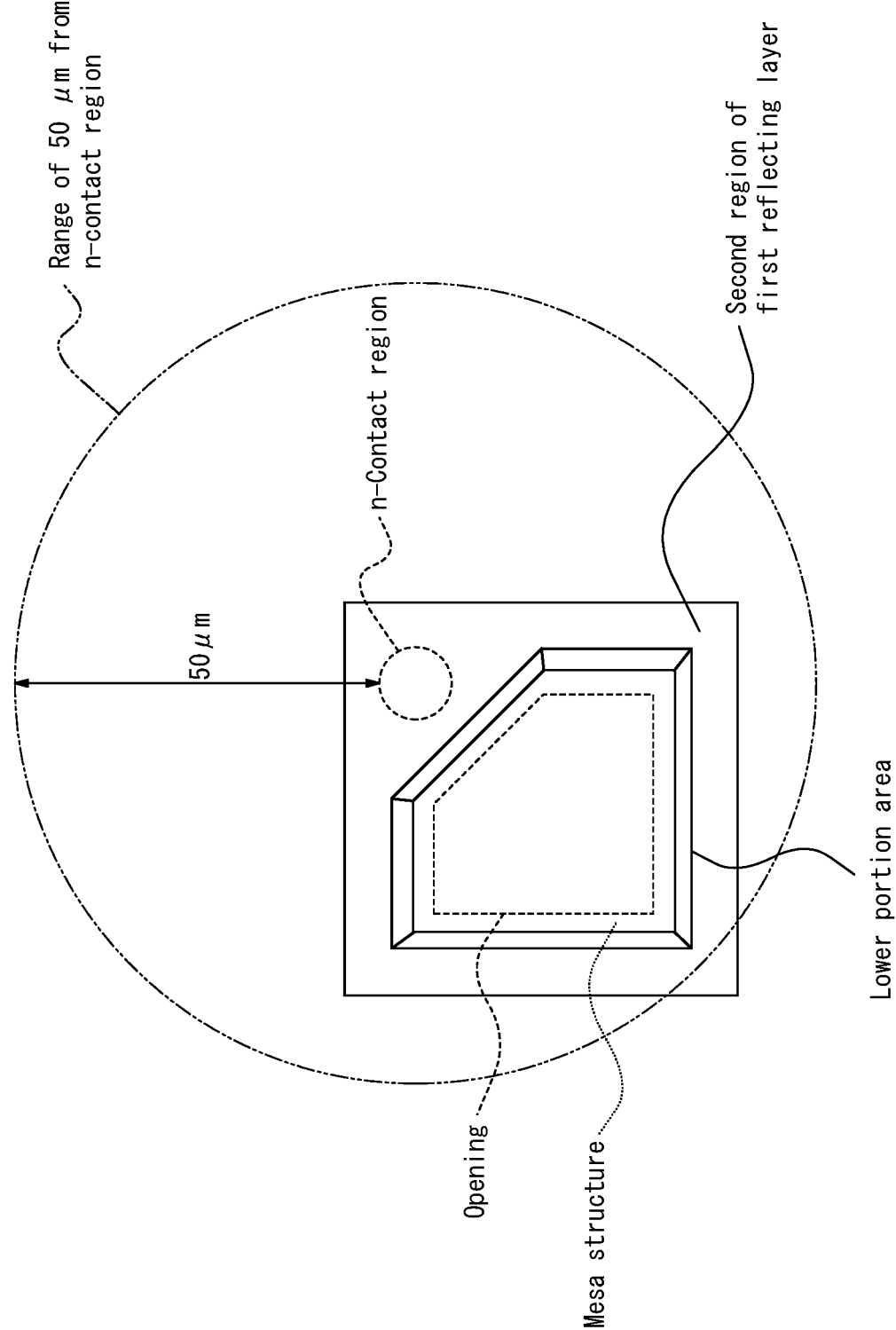
FIG. 5 is a plan diagram of an infrared optical device according to an embodiment.

FIG. 5 is a plan diagram for describing the infrared optical device according to the fourth embodiment. Note that the substrate, the insulating film, the first electrode layer, and the second electrode layer are omitted in FIG. 5. As illustrated in FIG. 5, the mesa structure is formed within a range of 50 μm from the n-contact region in the infrared optical device according to the fourth embodiment.

Figure 6:
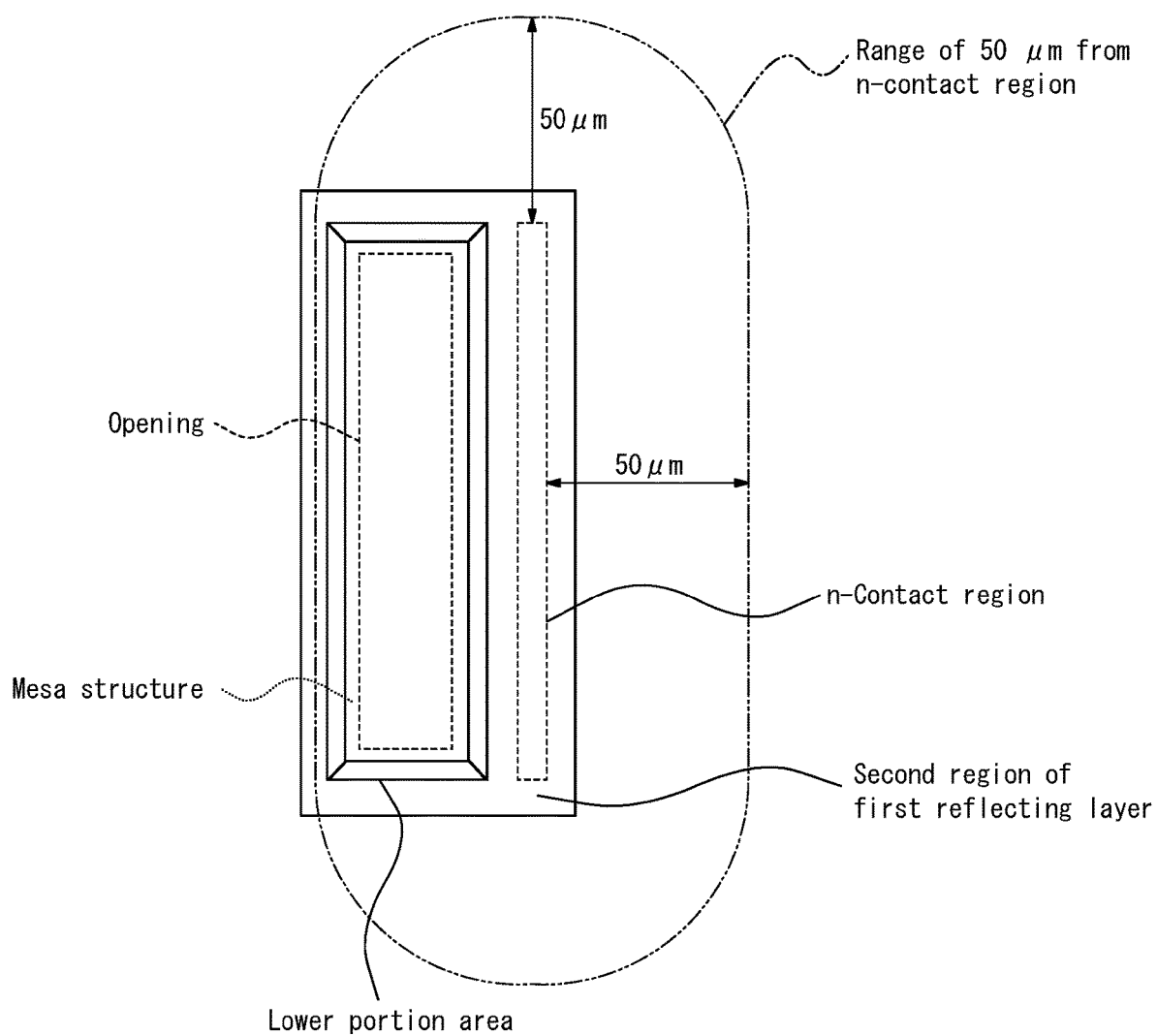
FIG. 6 is a plan diagram of an infrared optical device according to an embodiment.

FIG. 6 is a plan diagram for describing an infrared optical device according to a fifth embodiment. The plan view shape of the mesa structure may be a rectangular shape as illustrated in FIG. 6, or may be any shape.

Figure 7:
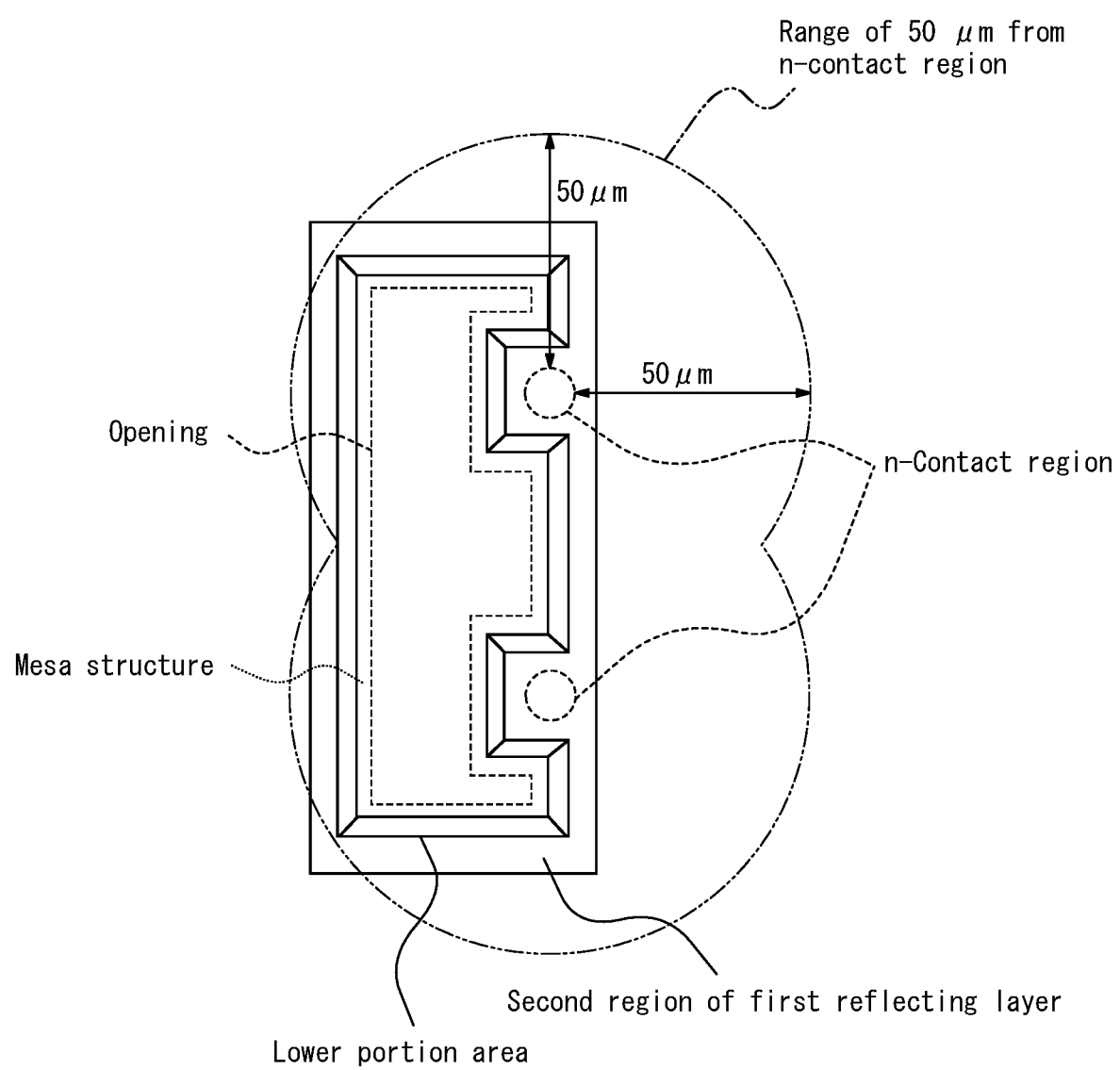
FIG. 7 is a plan diagram of an infrared optical device according to an embodiment.

FIG. 7 is a plan diagram for describing an infrared optical device according to a sixth embodiment. As illustrated in FIG. 7, a plurality of n-contact regions may be formed. In the infrared optical device according to the sixth embodiment, the mesa structure is formed within a region obtained by superimposing shapes corresponding to ranges of 50 μm from the respective n-contact regions.

Figure 8:
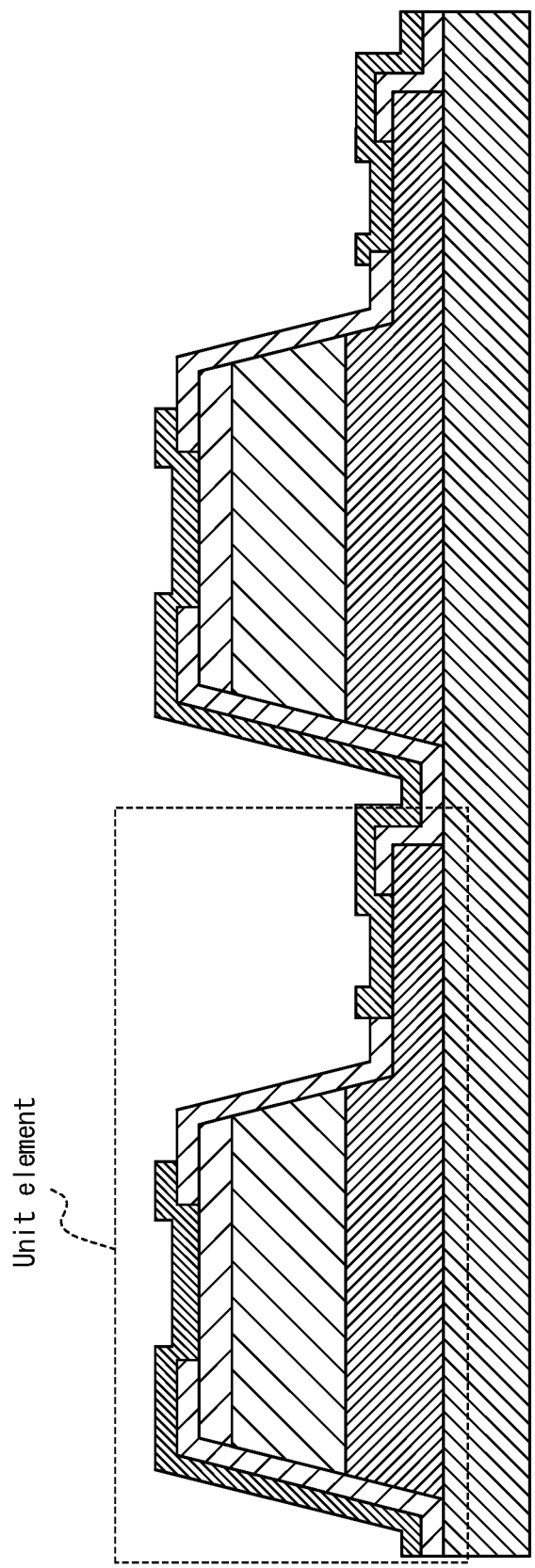
FIG. 8 is a cross-sectional diagram of an infrared optical device according to an embodiment.

FIG. 8 is a cross-sectional diagram for describing an infrared optical device according to a seventh embodiment. Layers in the cross-section are the same as in FIG. 4 and thus description of these layers is omitted. As illustrated in FIG. 8, the second region of the first reflecting layer, the mesa structure, the first electrode layer, and the second electrode layer constitute a unit element in the infrared optical device according to the seventh embodiment. A plurality of unit elements is electrically connected in series through the first electrode layer of one unit element being connected to the second electrode layer of another unit element.

FIG. 9 illustrates dependency of refractive index and extinction coefficient of an InSb layer with respect to n-type impurity concentration. Doping was performed using Sn. It is clear from FIG. 9 that as the n-type impurity concentration (i.e., the n-type carrier concentration) increases, the refractive index significantly decreases and the extinction coefficient significantly increases. This trend becomes more evident moving from short wavelength toward long wavelength. In particular, it can be seen that although a large refractive index difference between a low-refractive-index layer and a high-refractive-index layer can be obtained in a case in which the wavelength is 7 μm or more and the n-type impurity concentration is $3.0 \times 10^{18}/cm^3$ or more, the n-type semiconductor serving as the low-refractive-index layer has a large extinction coefficient (i.e., large absorption loss). On the other hand, the concentration dependency of refractive index and extinction coefficient with respect to p-type impurities was not evident compared to that with n-type impurities. Moreover, the same trend was observed for materials obtained through mixed crystallization of Al, Ga, and As with InSb. Note that a point at the left end of FIG. 9 where the n-type impurity concentration is 0 indicates a value for undoped i-InSb. The carrier concentration is determined by the impurity concentration and the activation rate. For example, the activation rate of Sn, which is an n-type impurity, was roughly 1. Moreover, the activation rate of Zn, which is a p-type impurity, was roughly 2.

Example 1 and Comparative Example 1

The following example is an example for a case in which an infrared optical device has a center wavelength λ of approximately 9.5 μm. Table 1 indicates a thin film structure in Example 1. Table 2 indicates a thin film structure in Comparative Example 1. In Example 1, a first reflecting layer has a three-layer structure formed of a low-refractive-index layer of layer numbers 5 and 6, a high-refractive-index layer of layer number 7, and a low-refractive-index layer of layer number 8. Layer number 4 is an active layer. Layer numbers 2 and 3 are a p-type semiconductor layer. Layer number 1 is a first electrode layer. Moreover, layer number 3 is a wide band gap layer that functions as a barrier layer with respect to electrons. Layer number 5 is a wide band gap layer that functions as a barrier layer with respect to holes.

TABLE 1

| Layer number | Film structure (impurity concentration) | Film thickness | Refractive index (9.5 μm) |
|---|---|---|---|
| 1 | Au/Pt/Ti | 300 nm/20 nm/20 nm | — |
| 2 | p-InSb (Zn: $3.5 \times 10^{18}$/cm$^3$) | 200 nm | 3.7 |
| 3 | p-Al$_{0.18}$In$_{0.82}$Sb (Zn: $3.5 \times 10^{18}$/cm$^3$) | 20 nm | 3.6 |
| 4 | π-InAs$_{0.13}$Sb$_{0.87}$ (Zn: $1.0 \times 10^{17}$/cm$^3$) | 2830 nm | 4 |
| 5 | n-Al$_{0.18}$In$_{0.82}$Sb (Sn: $7.0 \times 10^{18}$/cm$^3$) | 20 nm | 2.7 |
| 6 | n-InSb (Sn: $7.0 \times 10^{18}$/cm$^3$) | 640 nm | 2.2 |
| 7 | i-InSb (undoped) | 700 nm | 3.9 |
| 8 | n-InSb (Sn: $7.0 \times 10^{18}$/cm$^3$) | 740 nm | 2.2 |
| 9 | Semi-insulating GaAs | — | — |

TABLE 2

| Layer number | Film structure (impurity concentration) | Film thickness | Refractive index (9.5 μm) |
|---|---|---|---|
| 1 | Au/Pt/Ti | 300 nm/20 nm/20 nm | — |
| 2 | p-InSb (Zn: $3.5 \times 10^{18}$/cm$^3$) | 200 nm | 3.7 |
| 3 | i-InSb (undoped) | 1400 nm | 3.9 |
| 4 | p-Al$_{0.18}$In$_{0.82}$Sb (Zn: $3.5 \times 10^{18}$/cm$^3$) | 20 nm | 3.6 |
| 5 | π-InAs$_{0.13}$Sb$_{0.87}$ (Zn: $1.0 \times 10^{17}$/cm$^3$) | 300 nm | 4 |
| 6 | n-Al$_{0.18}$In$_{0.82}$Sb (Sn: $7.0 \times 10^{18}$/cm$^3$) | 20 nm | 2.7 |
| 7 | i-InSb (undoped) | 1180 nm | 3.9 |
| 8 | n-InSb (Sn: $7.0 \times 10^{18}$/cm$^3$) | 640 nm | 2.2 |
| 9 | i-InSb (undoped) | 700 nm | 3.9 |
| 10 | n-InSb (Sn: $7.0 \times 10^{18}$/cm$^3$) | 740 nm | 2.2 |
| 11 | Semi-insulating GaAs | — | — |

In Comparative Example 1, a first reflecting layer has a three-layer structure formed of a low-refractive-index layer of layer number 8, a high-refractive-index layer of layer number 9, and a low-refractive-index layer of layer number 10. Layer number 5 is an active layer. Layer number 2 is a p-type semiconductor layer. Layer number 1 is a first electrode layer. Layer numbers 3 and 7 are cladding layers that do not contribute directly to light emission or reception. A multilayered portion is formed of layer numbers 2 to 7, which include the cladding layers. The film thicknesses of the cladding layers are adjusted such that the active layer is positioned at an antinode of a standing wave electric field formed inside the multilayered portion.

Infrared optical device production was performed by the following procedure. First, thin film layers other than the Au/Pt/Ti layer (first electrode layer) indicated for Example 1 in Table 1 were formed on a semi-insulating GaAs substrate by MBE. A mesa structure was formed by performing etching up to the upper n-InSb layer by dry etching. In addition, etching for element isolation was performed in order that each infrared optical device was electrically independent. Thereafter, an insulating layer composed of SiO$_2$ and SiN was formed, and then window opening was performed for electrode-semiconductor contact portions (i.e., for an opening at an upper surface of the mesa structure and an n-contact region). Next, an electrode layer composed of a Au/Pt/Ti layer was formed such as to cover each window opening. The electrode layer at the top of the p-InSb layer functions as a first electrode layer and a metal reflecting mirror. The electrode layer at the top of the n-InSb layer functions as a second electrode layer.

Figure 10:
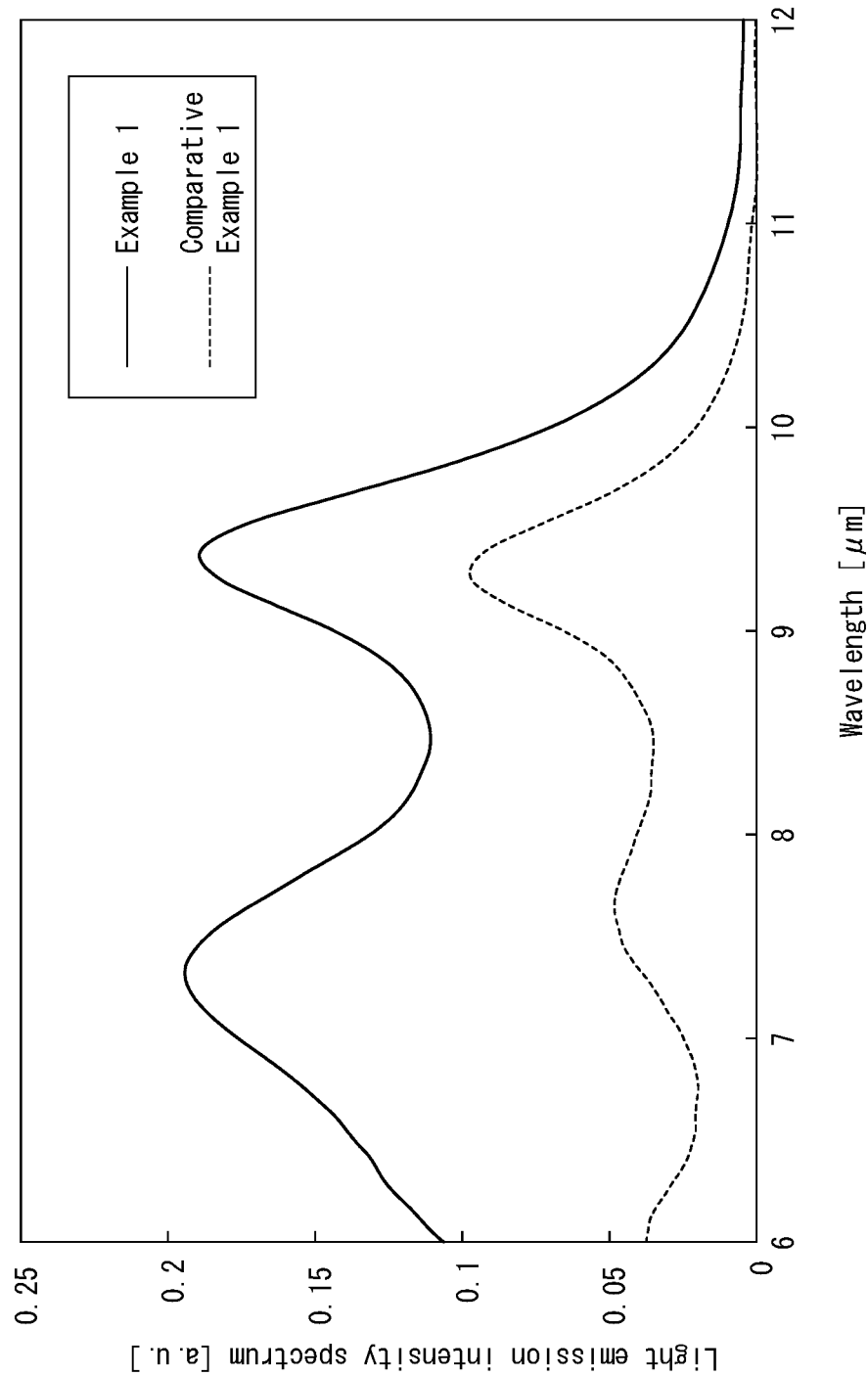
FIG. 10 is a diagram illustrating a comparison of light emission intensity spectra of infrared light-emitting elements of Example 1 and Comparative Example 1.

FIG. 10 illustrates a comparison of light emission intensity spectra for infrared light-emitting elements of Example 1 and Comparative Example 1. Infrared light was emitted from the GaAs substrate side. The light-emitting element of the present example exhibits a light emission intensity spectrum having a peak at approximately 9.5 μm. The light emission intensity at the wavelength of 9.5 μm in Example 1 is approximately twice as high as that in Comparative Example 1.

Figure 11:
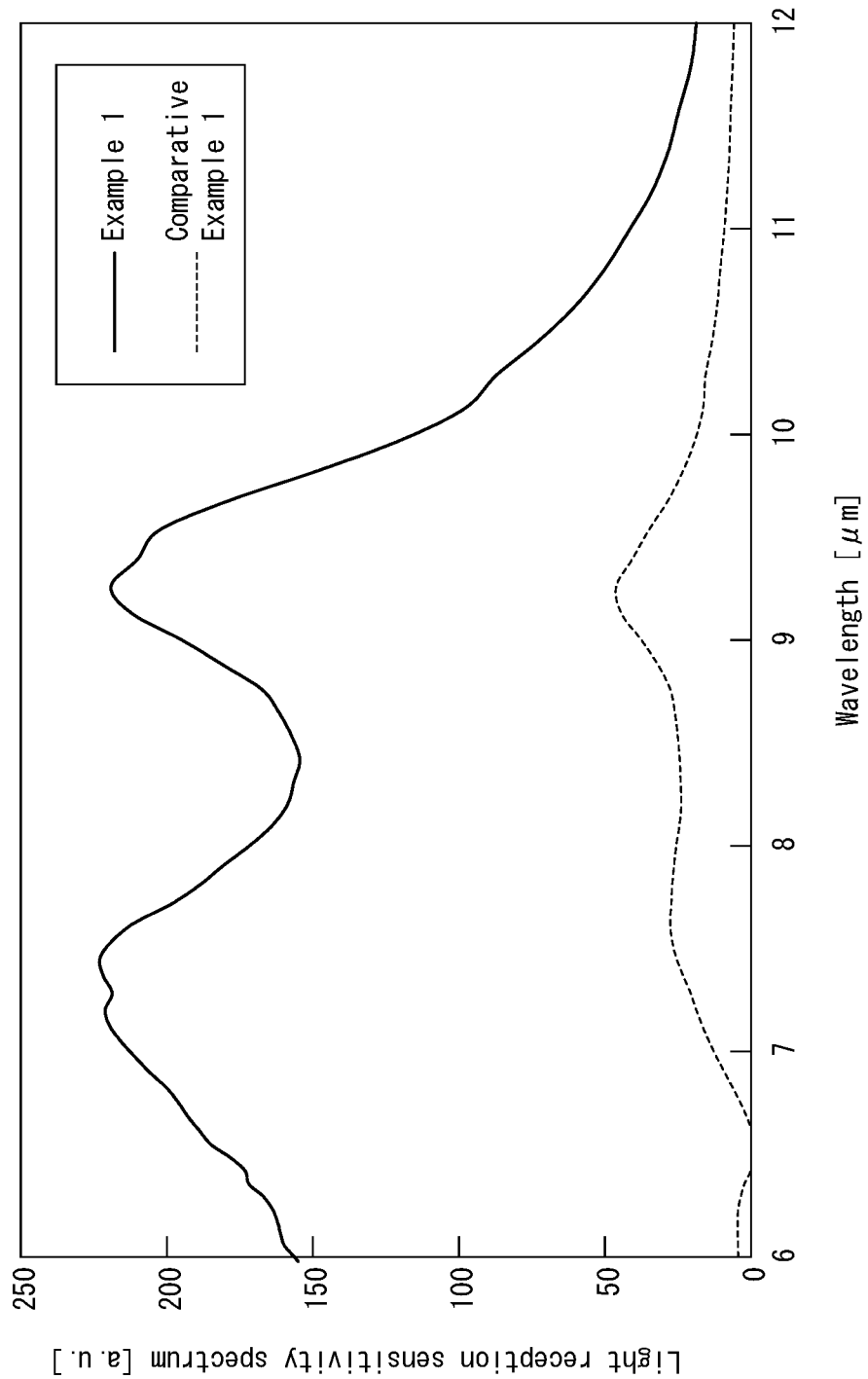
FIG. 11 is a diagram illustrating a comparison of light reception sensitivity spectra of infrared light-receiving elements of Example 1 and Comparative Example 1.

FIG. 11 illustrates a comparison of light reception sensitivity spectra for infrared light-receiving elements of Example 1 and Comparative Example 1. Infrared light was incident from the GaAs substrate side. The light-receiving element of the present example exhibits a light reception sensitivity spectrum having a peak at approximately 9.5 μm. The light reception sensitivity at the wavelength of 9.5 μm in Example 1 is approximately 5.7 times as high as that in Comparative Example 1.

Example 2 and Example 3

The following examples are examples for a case in which an infrared light-receiving element has a center wavelength λ of approximately 9.5 μm. Table 3 indicates a thin film structure in Example 2. Table 4 indicates a thin film structure in Example 3. In each of Examples 2 and 3, a first reflecting layer has a three-layer structure formed of a low-refractive-index layer of layer numbers 5 and 6, a high-refractive-index layer of layer number 7, and a low-refractive-index layer of layer number 8. Layer number 4 is a light-receiving layer. Layer numbers 2 and 3 are a p-type semiconductor layer. Layer number 1 is a first electrode layer. Moreover, layer number 3 is a wide band gap layer that functions as a barrier layer with respect to electrons. Layer number 5 is a wide band gap layer that functions as a barrier layer with respect to holes.

TABLE 3

| Layer number | Film structure (impurity concentration) | Film thickness | Refractive index (9.5 μm) |
|---|---|---|---|
| 1 | Au/Pt/Ti | 300 nm/20 nm/20 nm | — |
| 2 | p-InSb (Zn: $3.5 \times 10^{18}/cm^3$) | 200 nm | 3.7 |
| 3 | p-Al$_{0.18}$In$_{0.82}$Sb (Zn: $3.5 \times 10^{18}/cm^3$) | 20 nm | 3.6 |
| 4 | π-InAs$_{0.13}$Sb$_{0.87}$ (Zn: $1.0 \times 10^{17}/cm^3$) | 1720 nm | 4 |
| 5 | n-Al$_{0.18}$In$_{0.82}$Sb (Sn: $7.0 \times 10^{18}/cm^3$) | 20 nm | 2.7 |
| 6 | n-InSb (Sn: $7.0 \times 10^{18}/cm^3$) | 470 nm | 2.2 |
| 7 | i-InSb (undoped) | 700 nm | 3.9 |
| 8 | n-InSb (Sn: $7.0 \times 10^{18}/cm^3$) | 660 nm | 2.2 |
| 9 | Semi-insulating GaAs | — | — |

TABLE 4

| Layer number | Film structure (impurity concentration) | Film thickness | Refractive index (9.5 μm) |
|---|---|---|---|
| 1 | Au/Pt/Ti | 300 nm/20 nm/20 nm | — |
| 2 | p-InSb (Zn: $3.5 \times 10^{18}/cm^3$) | 200 nm | 3.7 |
| 3 | p-Al$_{0.18}$In$_{0.82}$Sb (Zn: $3.5 \times 10^{18}/cm^3$) | 20 nm | 3.6 |
| 4 | π-InAs$_{0.13}$Sb$_{0.87}$ (Zn: $1.0 \times 10^{17}/cm^3$) | 1580 nm | 4 |
| 5 | n-Al$_{0.18}$In$_{0.82}$Sb (Sn: $7.0 \times 10^{18}/cm^3$) | 20 nm | 2.7 |
| 6 | n-InSb (Sn: $7.0 \times 10^{18}/cm^3$) | 1052 nm | 2.2 |
| 7 | i-InSb (undoped) | 607 nm | 3.9 |
| 8 | n-InSb (Sn: $7.0 \times 10^{18}/cm^3$) | 1072 nm | 2.2 |
| 9 | Semi-insulating GaAs | — | — |

The film thickness of a multilayered portion in Example 2 is 1940 nm. The effective refractive index is 3.96 (=(3.7×200+3.6×20+4×1720)/1940), and film thickness of the thin film structure is designed such as to satisfy $3\lambda/(4n_c)<L<4\lambda/(4n_c)$. Moreover, the low-refractive-index layers of the first reflecting layer in Example 2 each have a film thickness of smaller than $\lambda/(4n_L)$. The film thickness of the high-refractive-index layer is designed such as to be larger than $\lambda/(4n_H)$. Furthermore, the film thickness of the low-refractive-index layer of layer numbers 5 and 6 is smaller than the film thickness of the high-refractive-index layer of layer number 7.

The film thickness of a multilayered portion in Example 3 is 1800 nm. The effective refractive index is 3.96 (=(3.7×200+3.6×20+4×1580)/1800), and film thickness of the thin film structure is designed such as to satisfy $L=3\lambda/(4n_c)$. Moreover, a low-refractive-index layer and a high-refractive-index layer of the first reflecting layer in Example 3 are designed such that the thicknesses thereof respectively satisfy $\lambda/(4n_L)$ and $\lambda/(4n_H)$.

When absorbance in the light-receiving layer upon irradiation with light having a wavelength of 9.5 μm from the GaAs substrate was calculated through thin film interference simulation using Fresnel equations, the absorbance was 57% for an infrared light-receiving element of Example 2. Moreover, the absorbance was 41% for an infrared light-receiving element of Example 3. This is an effect that is due, in particular, to reduction of absorption loss in the low-refractive-index layer of layer number 6. Example 2 is a more preferable structure since it is possible to obtain light reception sensitivity that is approximately 1.4 times higher.

Example 4

The following example is an example for a case in which an infrared optical device has a center wavelength λ of approximately 8.5 μm. Table 5 indicates a thin film structure according to Example 4. In Example 4, a first reflecting layer has a four-layer structure formed of a low-refractive-index layer of layer numbers 5 and 6, a high-refractive-index layer of layer number 7, a low-refractive-index layer of layer number 8, and a high-refractive-index layer of layer number 9. Layer number 4 is an active layer. Layer numbers 2 and 3 are a p-type semiconductor layer. Layer number 1 is a first electrode layer. Moreover, layer number 3 is a wide band gap layer that functions as a barrier layer with respect to electrons. Layer number 5 is a wide band gap layer that functions as a barrier layer with respect to holes.

TABLE 5

| Layer number | Film structure (impurity concentration) | Film thickness | Refractive index (8.5 μm) |
|---|---|---|---|
| 1 | Au/Pt/Ti | 300 nm/20 nm/20 nm | — |
| 2 | p-InSb (Zn: $3.5 \times 10^{18}/cm^3$) | 200 nm | 3.8 |
| 3 | p-Al$_{0.18}$In$_{0.82}$Sb (Zn: $3.5 \times 10^{18}/cm^3$) | 20 nm | 3.6 |
| 4 | π-InAs$_{0.09}$Sb$_{0.91}$ (Zn: $1.0 \times 10^{17}/cm^3$) | 2600 nm | 4 |
| 5 | n-Al$_{0.18}$In$_{0.82}$Sb (Sn: $7.0 \times 10^{18}/cm^3$) | 20 nm | 2.9 |
| 6 | n-InSb (Sn: $7.0 \times 10^{18}/cm^3$) | 300 nm | 2.6 |
| 7 | i-InSb (undoped) | 630 nm | 3.9 |
| 8 | n-InSb (Sn: $7.0 \times 10^{18}/cm^3$) | 450 nm | 2.6 |
| 9 | i-InSb (undoped) | 570 nm | 3.9 |
| 10 | Semi-insulating GaAs | — | — |

In Example 4, the film thickness of the thin film structure is designed such that the film thickness L of a multilayered portion satisfies $5\lambda/(4n_c)<L<6\lambda/(4n_c)$. Moreover, the film thickness of each low-refractive-index layer of the first reflecting layer in Example 4 is designed such as to be smaller than $\lambda/(4n_L)$. Furthermore, the film thickness of each high-refractive-index layer is designed such as to be larger than $\lambda/(4n_H)$. The film thicknesses of the low-refractive-index layer of layer numbers 5 and 6 and the low-refractive-index layer of layer number 8 are smaller than the film thicknesses of the high-refractive-index layer of layer number 7 and the high-refractive-index layer of layer number 9.

Infrared optical device production was performed by the same procedure as in Example 1.

Figure 12:
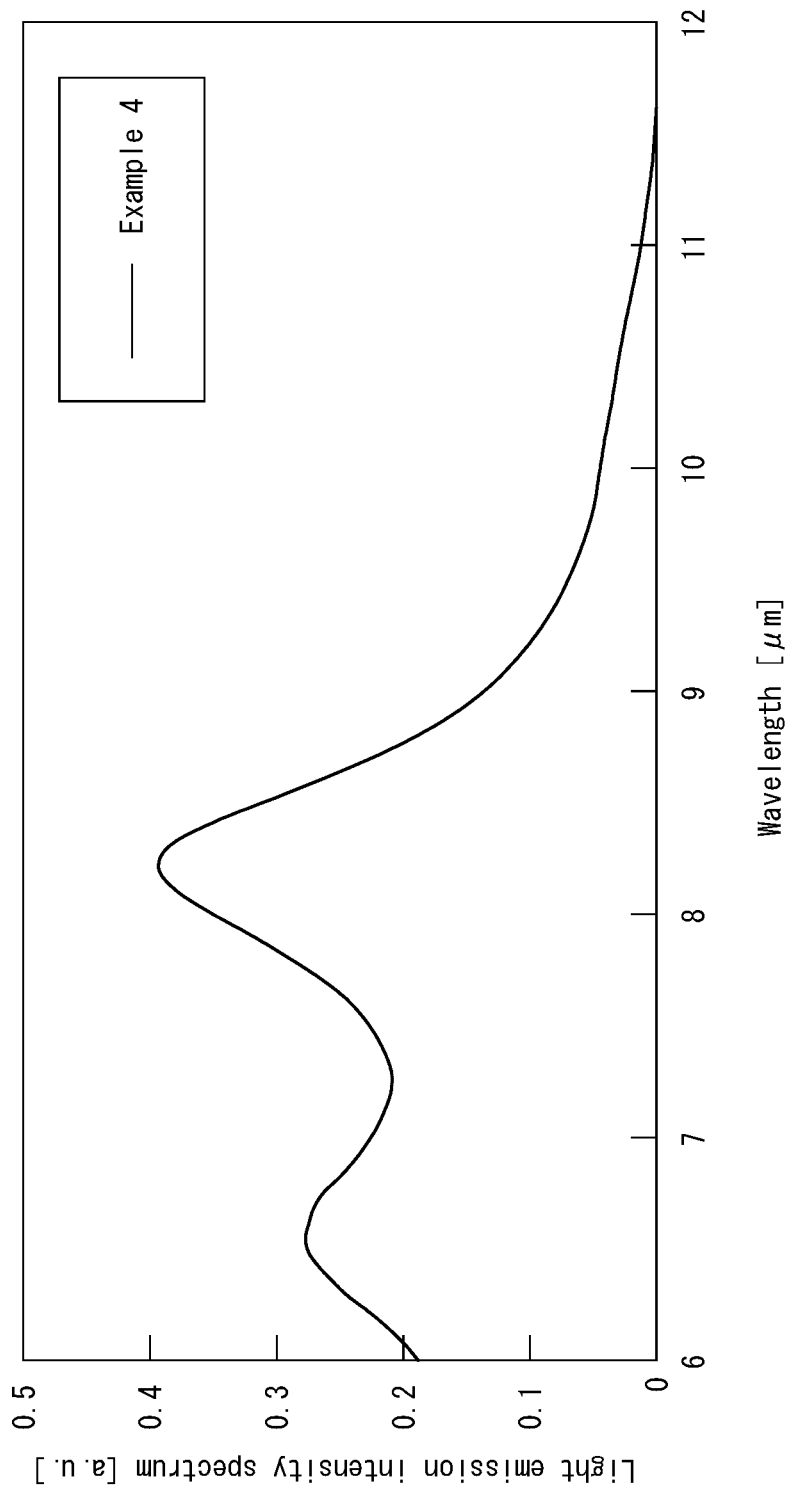
FIG. 12 is a diagram illustrating a light emission intensity spectrum of an infrared light-emitting element of Example 4.

FIG. 12 illustrates a light emission intensity spectrum for an infrared light-emitting element of Example 4. Infrared light was emitted from the GaAs substrate side. The light-emitting element of the present example exhibits a light emission intensity spectrum having a peak at approximately 8.5 μm.

Figure 13:
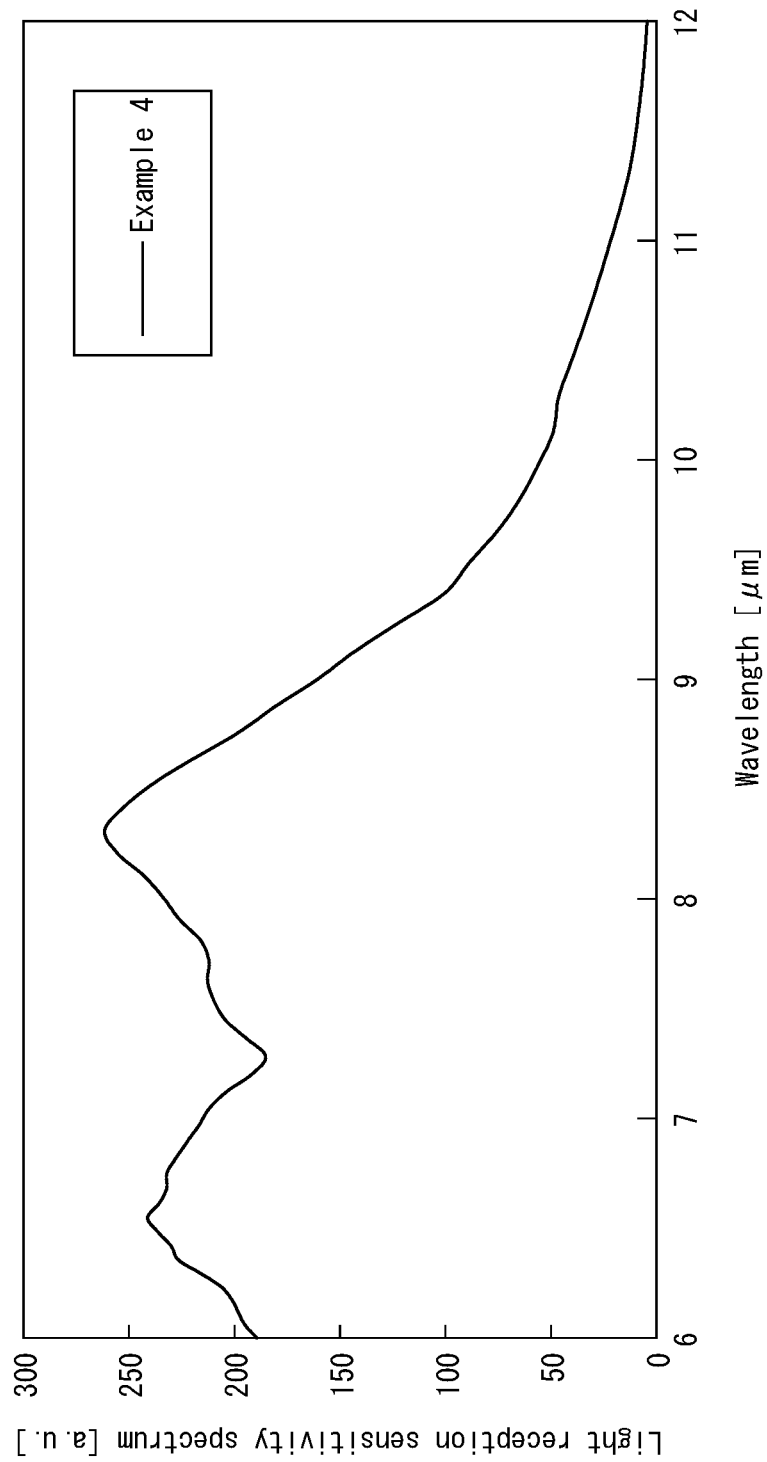
FIG. 13 is a diagram illustrating a light reception sensitivity spectrum of an infrared light-receiving element of Example 4.

FIG. 13 illustrates a light reception sensitivity spectrum for an infrared light-receiving element of Example 4. Infrared light was incident from the GaAs substrate side. The light-receiving element of the present example exhibits a light reception sensitivity spectrum having a peak at approximately 8.5 μm.

By designing film thickness of a thin film laminate portion based on the refractive indices of materials in this manner, it is possible to produce an infrared optical device that has a light emission/reception characteristic having a peak at a desired center wavelength λ.

Example 5

The following example is an example for a case in which an infrared light-emitting element has a center wavelength λ of approximately 9.5 μm. Table 6 indicates a thin film structure according to Example 5. In Example 5, a first reflecting layer has a two-layer structure formed of a low-refractive-index layer of layer numbers 5 and 6 and a high-refractive-index layer of layer numbers 7 and 8. A second reflecting layer is formed in layer numbers 9 to 17. The second reflecting layer is constructed through alternate layering of a high-refractive-index layer of GaAs and a low-refractive-index layer of AlGaAs. Layer number 4 is an active layer. Layer numbers 2 and 3 are a p-type semiconductor layer. Layer number 1 is a first electrode layer. Moreover, layer number 3 is a wide band gap layer that functions as a barrier layer with respect to electrons. Layer number 5 is a wide band gap layer that functions as a barrier layer with respect to holes.

TABLE 6

| Layer number | Film structure (impurity concentration) | Film thickness | Refractive index (9.5 μm) |
|---|---|---|---|
| 1 | Au/Pt/Ti | 300 nm/20 nm/20 nm | — |
| 2 | p-InSb (Zn: 3.5 × $10^{18}$/cm$^3$) | 200 nm | 3.7 |
| 3 | p-Al$_{0.18}$In$_{0.82}$Sb (Zn: 3.5 × $10^{18}$/cm$^3$) | 20 nm | 3.6 |
| 4 | π-InAs$_{0.13}$Sb$_{0.87}$ (Zn: 1.0 × $10^{17}$/cm$^3$) | 1820 nm | 4 |
| 5 | n-Al$_{0.18}$In$_{0.82}$Sb (Sn: 7.0 × $10^{18}$/cm$^3$) | 20 nm | 2.7 |
| 6 | n-InSb (Sn: 7.0 × $10^{18}$/cm$^3$) | 330 nm | 2.2 |
| 7 | i-InSb (undoped) | 500 nm | 3.9 |
| 8 | GaAs | 180 nm | 3.3 |
| 9 | AlGaAs | 810 nm | 2.9 |
| 10 | GaAs | 730 nm | 3.3 |
| 11 | Al$_{0.8}$Ga$_{0.2}$As | 810 nm | 2.9 |
| 12 | GaAs | 730 nm | 3.3 |
| 13 | Al$_{0.8}$Ga$_{0.2}$As | 810 nm | 2.9 |
| 14 | GaAs | 730 nm | 3.3 |
| 15 | Al$_{0.8}$Ga$_{0.2}$As | 810 nm | 2.9 |
| 16 | GaAs | 730 nm | 3.3 |
| 17 | Al$_{0.8}$Ga$_{0.2}$As | 810 nm | 2.9 |
| 18 | Semi-insulating GaAs | — | — |

In Example 5, the film thickness of the thin film structure is designed such that the film thickness L of a multilayered portion satisfies $3\lambda/(4n_c) < L < 4\lambda/(4n_c)$. Moreover, the film thickness of the low-refractive-index layer of the first reflecting layer in Example 5 is designed such as to be smaller than $\lambda/(4n_L)$. Furthermore, the film thickness of the high-refractive-index layer is designed such as to be larger than $\lambda/(4n_H)$. Furthermore, the film thickness of the low-refractive-index layer of layer numbers 5 and 6 is smaller than the film thickness of the high-refractive-index layer of layer numbers 7 and 8.

Infrared light-emitting element production was performed by the same procedure as in Example 1.

Figure 14:
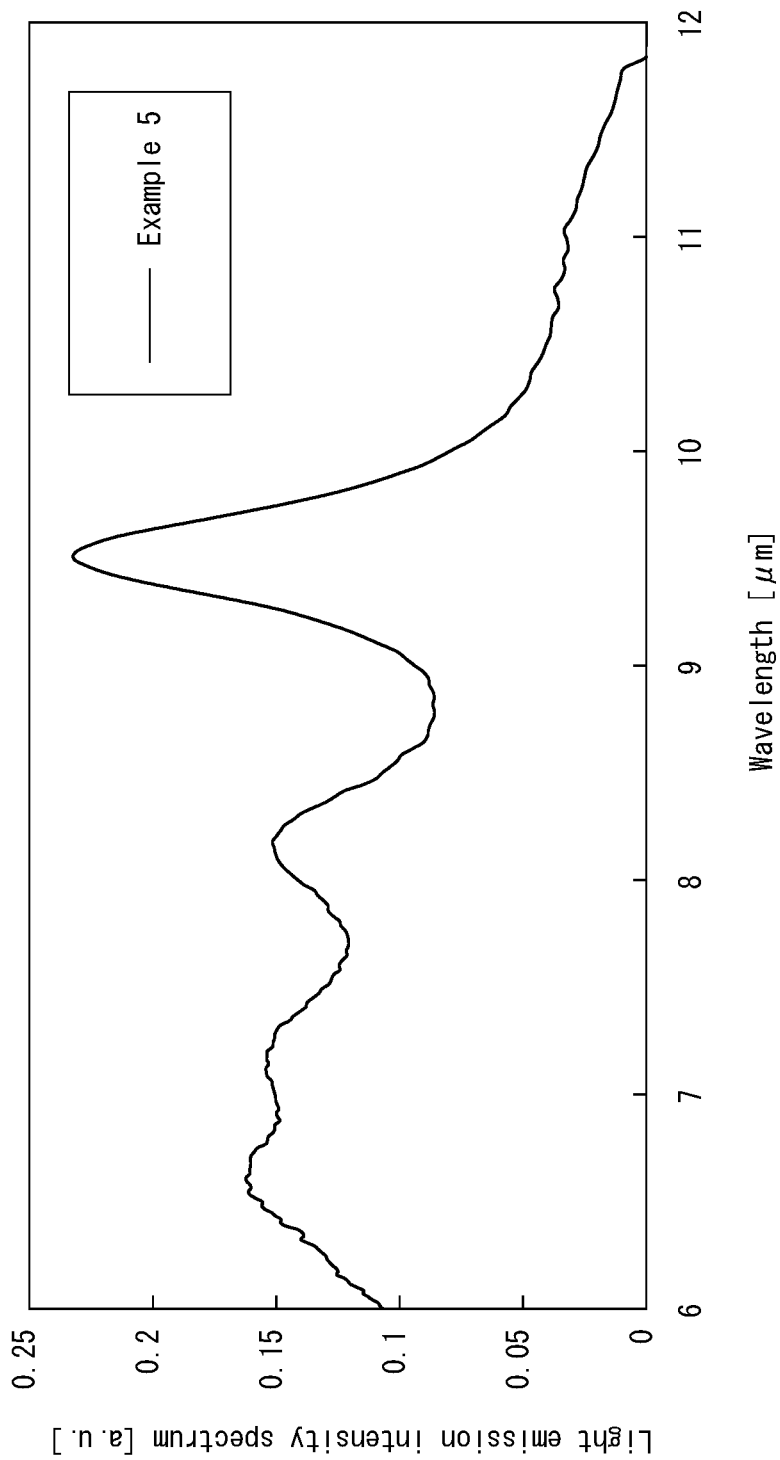
FIG. 14 is a diagram illustrating a light emission intensity spectrum of an infrared light-emitting element of Example 5.

FIG. 14 illustrates a light emission intensity spectrum for an infrared light-emitting element of Example 5. Infrared light was emitted from the GaAs substrate side. The light-emitting element of the present example exhibits a light emission intensity spectrum having a peak at approximately 9.5 μm.

Example 6

Figure 15:
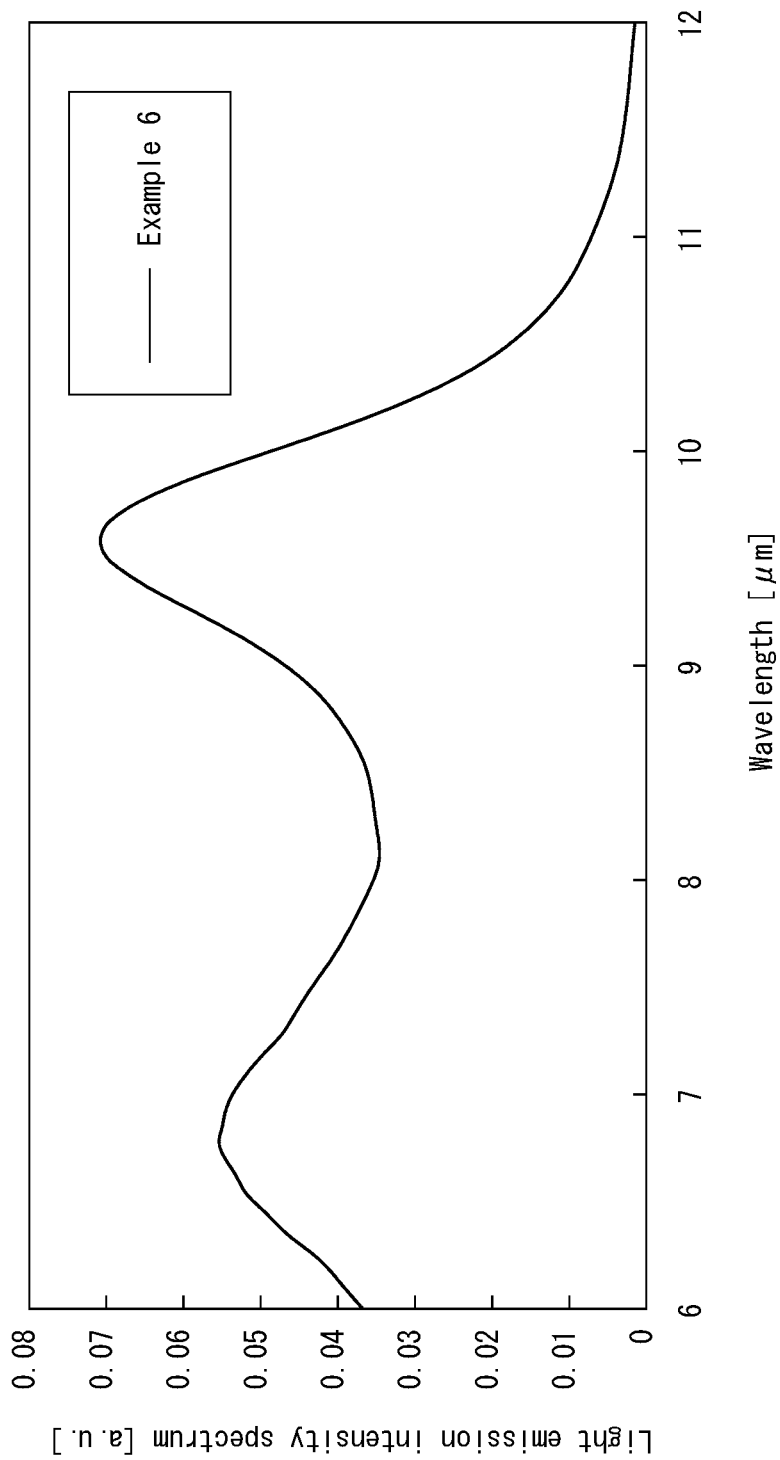
FIG. 15 is a diagram illustrating a light emission intensity spectrum of an infrared light-emitting element of Example 6.

The following example is an example for a case in which an infrared light-emitting element has a center wavelength λ of approximately 9.5 μm. Table 7 indicates a thin film structure in Example 6. In Example 6, a first reflecting layer has a three-layer structure formed of a low-refractive-index layer of layer numbers 10 and 11, a high-refractive-index layer of layer number 12, and a low-refractive-index layer of layer number 13. Layer numbers 4 and 9 are light-emitting layers. Layer numbers 2 and 3 are a p-type semiconductor layer. Layer number 1 is a first electrode layer. Layer numbers 5 to 8 are a tunnel junction layer. Moreover, layer numbers 3 and 8 are wide band gap layers that function as barrier layers with respect to electrons. Layer numbers 5 and 10 are wide band gap layers that function as barrier layers with respect to holes. The configuration of the first reflecting layer in Example 6 is the same as that in Example 2 indicated in Table 3. Infrared light-emitting device production was performed by the same procedure as in Example 1. FIG. 15 illustrates a light emission intensity spectrum for an infrared light-emitting element of Example 6. Infrared light was emitted from the GaAs substrate side. The light-emitting element of the present example exhibits a light emission intensity spectrum having a peak at approximately 9.5 μm.

TABLE 7

| Layer number | Film structure (impurity concentration) | Film thickness | Refractive index (9.5 μm) |
|---|---|---|---|
| 1 | Au/Pt/Ti | 300 nm/20 nm/20 nm | — |
| 2 | p-InSb (Zn: 3.5 × $10^{18}$/cm$^3$) | 200 nm | 3.7 |
| 3 | p-Al$_{0.18}$In$_{0.82}$Sb (Zn: 3.5 × $10^{18}$/cm$^3$) | 20 nm | 3.6 |
| 4 | π-InAs$_{0.13}$Sb$_{0.87}$ (Zn: 1.0 × $10^{17}$/cm$^3$) | 770 nm | 4 |
| 5 | n-Al$_{0.18}$In$_{0.82}$Sb (Sn: 7.0 × $10^{18}$/cm$^3$) | 20 nm | 2.7 |
| 6 | n-InAs$_{0.13}$Sb$_{0.87}$ (Sn: 1.0 × $10^{18}$/cm$^3$) | 100 nm | 1.9 |
| 7 | p-InSb (Zn: 3.5 × $10^{18}$/cm$^3$) | 100 nm | 3.7 |
| 8 | p-Al$_{0.18}$In$_{0.82}$Sb (Zn: 3.5 × $10^{18}$/cm$^3$) | 20 nm | 3.6 |

TABLE 7-continued

| Layer number | Film structure (impurity concentration) | Film thickness | Refractive index (9.5 μm) |
|---|---|---|---|
| 9 | π-InAs$_{0.13}$Sb$_{0.87}$ (Zn: 1.0 × 10$^{17}$/cm$^3$) | 700 nm | 4 |
| 10 | n-Al$_{0.18}$In$_{0.82}$Sb (Sn: 7.0 × 10$^{18}$/cm$^3$) | 20 nm | 2.7 |
| 11 | n-InSb (Sn: 7.0 × 10$^{18}$/cm$^3$) | 470 nm | 2.2 |
| 12 | i-InSb (undoped) | 700 nm | 3.9 |
| 13 | n-InSb (Sn: 7.0 × 10$^{18}$/cm$^3$) | 660 nm | 2.2 |
| 14 | Semi-insulating GaAs | — | — |

Example 7 and Example 8

The following examples are examples for a case in which an infrared optical device has a center wavelength λ of approximately 9.5 μm. A thin film structure in Example 7 and Example 8 is the same structure as in Table 3. Infrared optical device production was performed by the following procedure. First, thin film layers other than the Au/Pt/Ti layer (first electrode layer) indicated for Example 1 in Table 1 were formed on a semi-insulating GaAs substrate by MBE. A mesa structure was formed by performing etching up to the upper n-InSb layer by dry etching. In addition, etching for element isolation was performed in order that each infrared optical device was electrically independent. Thereafter, an insulating layer composed of SiN was formed, and then window opening was performed for electrode-semiconductor contact portions (i.e., for an opening at an upper surface of the mesa structure and an n-contact region). Next, an electrode layer composed of a Au/Pt/Ti layer was formed such as to cover each window opening.

Note that the SiN was formed as 200 nm in Example 7, whereas the SiN was formed as 50 nm in Example 8. In order to ensure margin for error in production, there is a region in which the first electrode layer and the insulating film overlap at the upper surface of the mesa structure. In this case, the film thickness $t_i$ of the insulating film present between the upper surface of the mesa structure and the first electrode layer was 200 nm in Example 7 and 50 nm in Example 8. A ratio r of optical film thicknesses of a multilayered portion and the insulating film (r=$t_i n_i$/Ln$_c$) was 0.027 in Example 7. Moreover, the ratio r was 0.007 in Example 8. Note that $n_i$ referred to here is the refractive index of the insulating film at the center wavelength λ. L is the film thickness of the multilayered portion. $n_c$ is the effective refractive index of the multilayered portion at the center wavelength λ. For the thin film structures in Example 7 and Example 8, Ln$_c$=200×3.7+20×3.6+1720×4=7692. The refractive index $n_i$ of SiN at a wavelength of 9.5 μm is 1.05.

Figure 16:
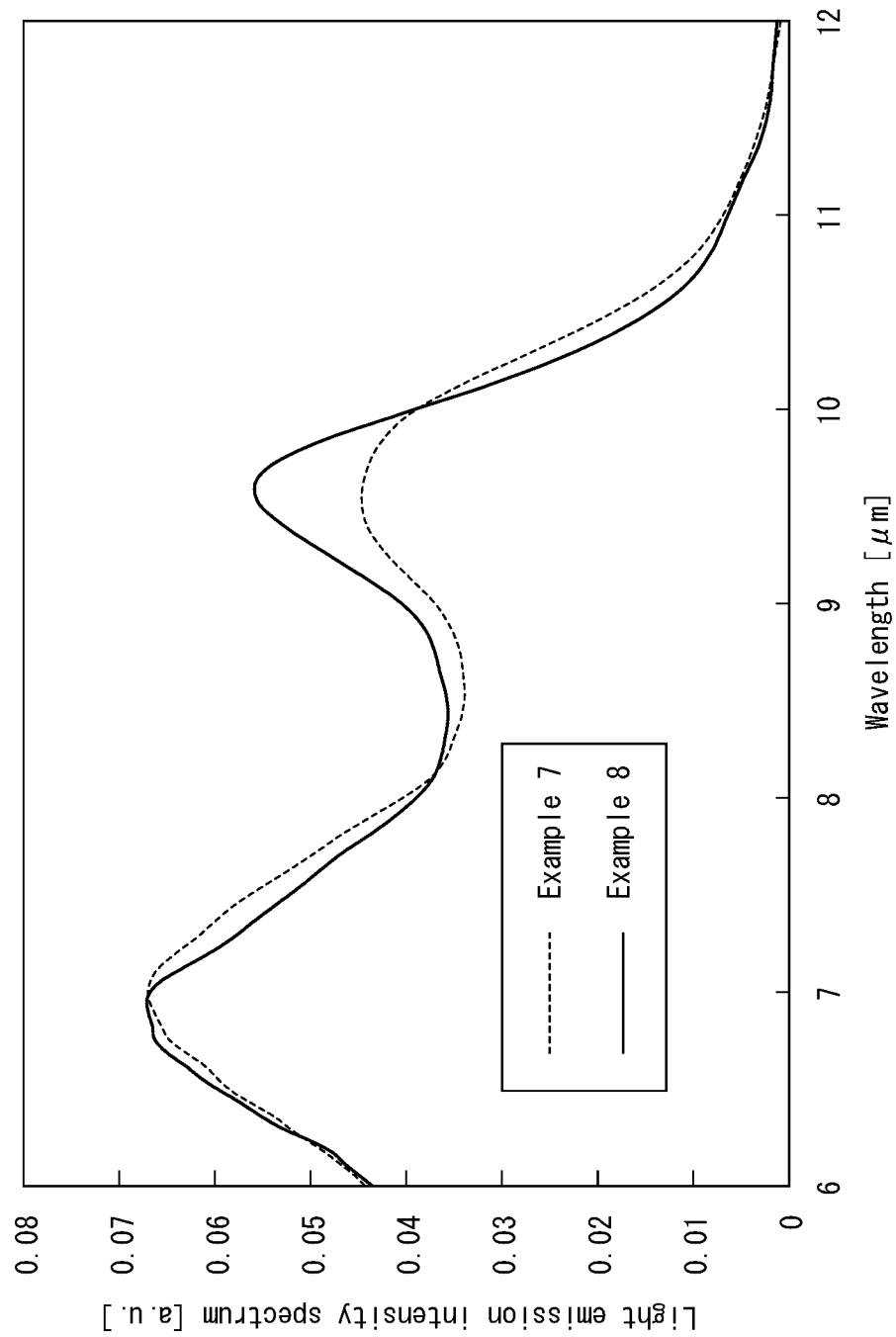
FIG. 16 is a diagram illustrating a comparison of light emission intensity spectra of infrared light-emitting elements of Example 7 and Example 8.

FIG. 16 illustrates a comparison of light emission intensity spectra for infrared light-emitting elements of Example 7 and Example 8. Infrared light was emitted from the GaAs substrate side. The light-emitting elements of the present examples each exhibit a light emission intensity spectrum having a peak at approximately 9.5 μm. Example 8, which has a smaller ratio r of optical film thicknesses of the multilayered portion and the insulating film, exhibits higher light emission intensity at a wavelength of 9.5 μm.

Figure 17:
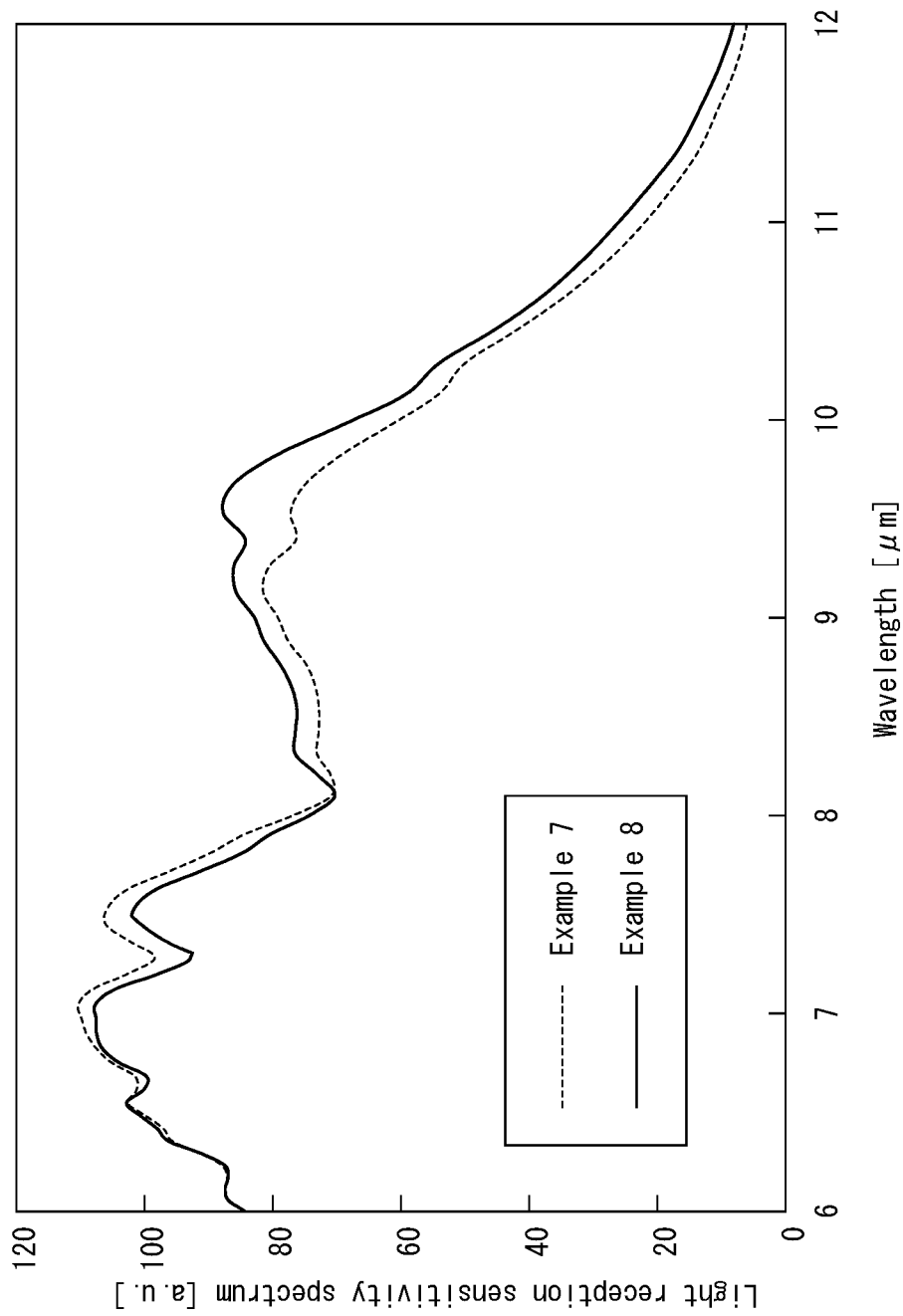
FIG. 17 is a diagram illustrating a comparison of light reception sensitivity spectra of infrared light-receiving elements of Example 7 and Example 8.

FIG. 17 illustrates a comparison of light reception sensitivity spectra for infrared light-receiving elements of Example 7 and Example 8. Infrared light was incident from the GaAs substrate side. The light-receiving elements of the present examples each exhibit a light reception sensitivity spectrum having a peak at approximately 9.5 μm. Example 8, which has a smaller ratio r of optical film thicknesses of the multilayered portion and the insulating film, exhibits higher light reception sensitivity at a wavelength of 9.5 μm.

Figure 18:
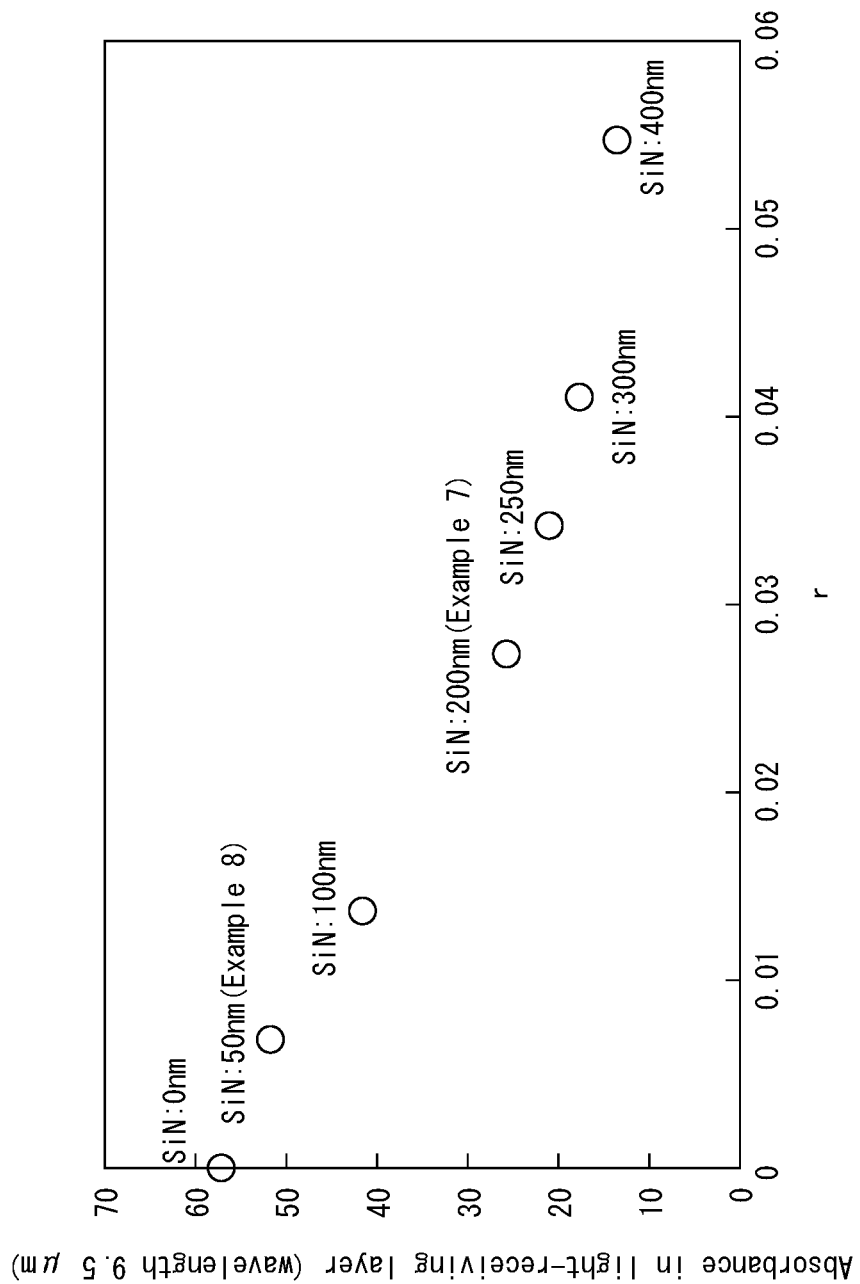
FIG. 18 is a diagram illustrating calculation results for dependency of absorbance in a light-receiving layer with respect to a ratio r of optical film thicknesses of a multilayered portion and an insulating film (insulating film=SiN) in an infrared light-receiving element according to an embodiment.

Absorbance in the light-receiving layer upon irradiation with light having a wavelength of 9.5 μm from the GaAs substrate was calculated through thin film interference simulation using Fresnel equations for a thin film structure in which SiN serving as an insulating film was inserted between layer number 1 and layer number 2 in Table 3. FIG. 18 illustrates dependency of absorbance in the light-receiving layer with respect to the ratio r of optical thicknesses of the multilayered portion and the insulating film. The insulating film is SiN.

In a region where the first electrode layer and the insulating film overlap at the upper surface of the mesa structure, the active layer, the p-type semiconductor layer, and the insulating film can be considered to constitute a resonator, and a light reception characteristic having at a peak at a position deviating from the desired center wavelength of 9.5 μm arises. Accordingly, it is clear from FIG. 18 that absorbance of light having a wavelength of 9.5 μm in the light-receiving layer decreases with increasing thickness of the insulating film.

In the present embodiment, it is preferable to satisfy $t_i n_i$<0.03×Ln. It is more preferable that $t_i n_i$<0.02×Ln. It is even more preferable that $t_i n_i$<0.01×Ln.

Example 9 and Example 10

The following examples are examples for a case in which an infrared light-receiving element has a center wavelength λ of approximately 9.5 μm. A thin film structure in Example 9 and Example 10 is the same structure as in Table 3. Infrared optical device production was performed by the same procedure as in Example 8.

In Examples 8 to 10, the area of a lower portion of the mesa structure was 256 μm$^2$. The area of the opening in Example 8 was 66 μm$^2$ and thus was 26% of the area of the lower portion of the mesa structure. The area of the opening in Example 9 was 112 μm$^2$ and thus was 44% of the area of the lower portion of the mesa structure. The area of the opening in Example 10 was 165 μm$^2$ and thus was 64% of the area of the lower portion of the mesa structure.

Figure 19:
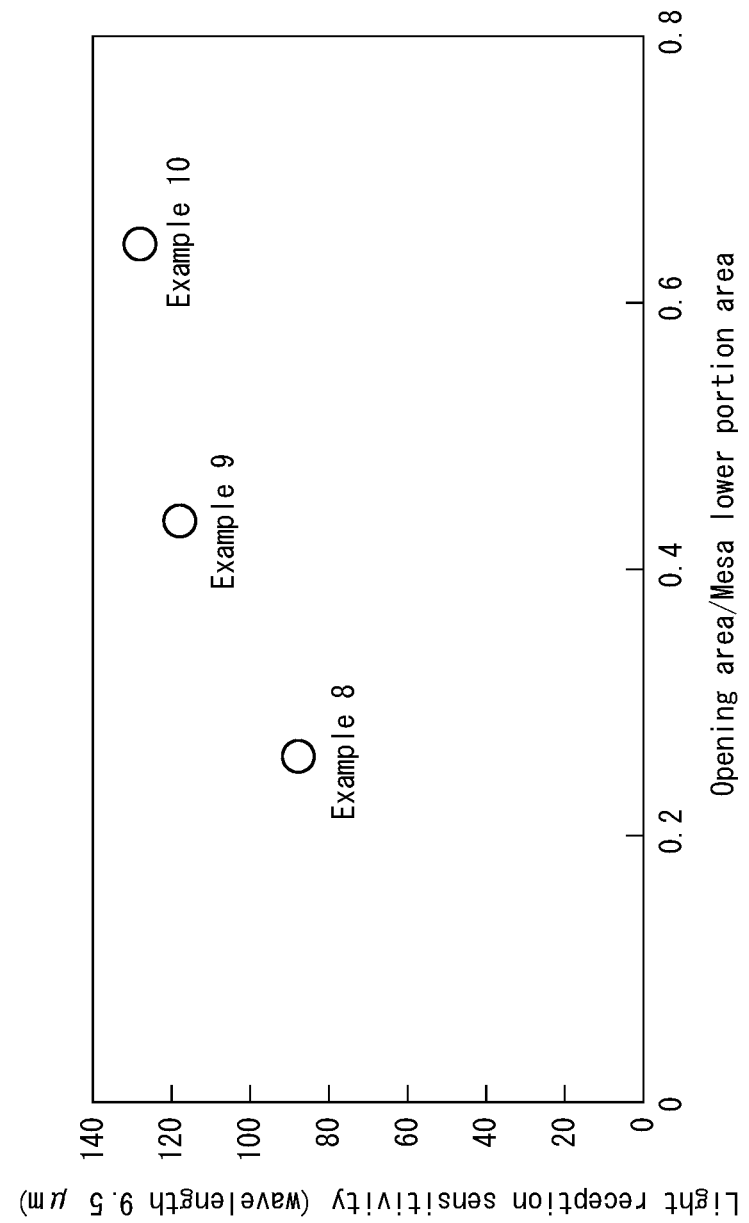
FIG. 19 is a diagram illustrating light reception sensitivity at a wavelength of 9.5 μm for infrared light-receiving elements of Examples 8 to 10.

FIG. 19 illustrates light reception sensitivity at a wavelength of 9.5 μm for infrared light-receiving elements of Examples 8 to 10. Infrared light was incident from the GaAs substrate side. The area of the opening is preferably 40% or more of the area of the lower portion of the mesa structure in order to bring about a resonance effect for more infrared light that is incident on the mesa structure. The aforementioned area is more preferably 60% or more.

Example 11

The following example is an example for a case in which an infrared light-receiving element has a center wavelength λ of approximately 9.5 μm. A thin film structure in Example 11 is the same structure as in Table 3. An infrared light-receiving element was produced through the same procedure as in Example 1 such that the mesa structure had a shape in which a corner was missing from a square such as illustrated in FIG. 5.

The distance from a point closet to the mesa structure in the n-contact region and a point furthest from the n-contact region in a region in which the area of the lower portion of the mesa structure was present was taken to be x. Infrared light-receiving elements in which the distance x ranged from 20 μm to 110 μm were produced.

Figure 20:
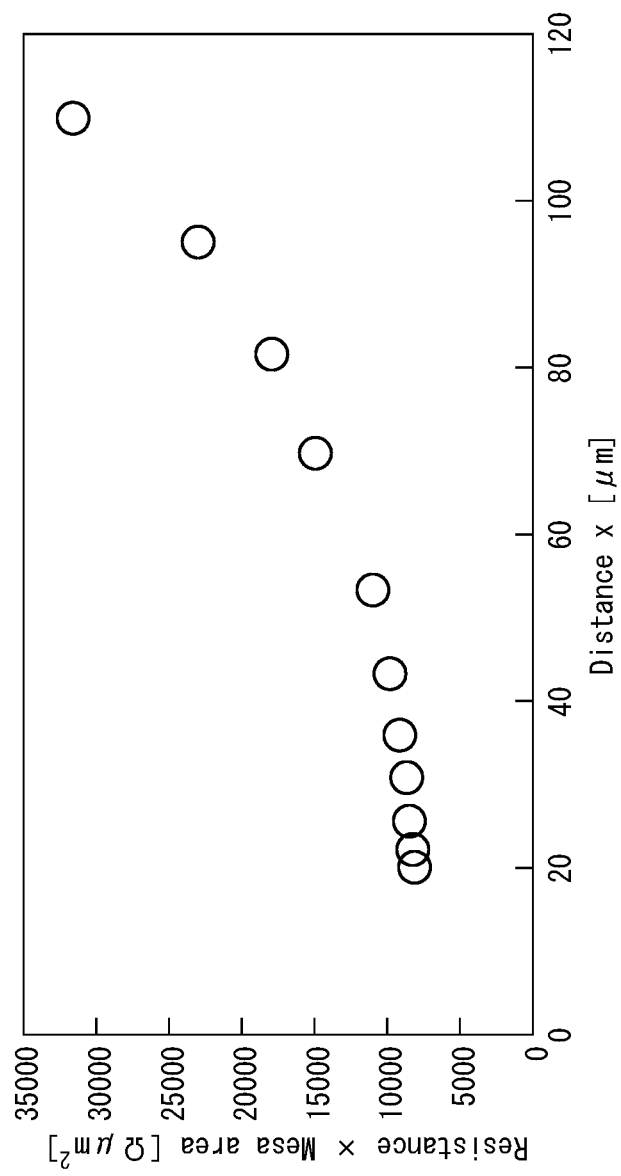
FIG. 20 is a diagram illustrating a plot in which "resistance between first and second electrode layers×mesa lower portion area" is plotted against "distance x" for an infrared light-receiving element of Example 11.

FIG. 20 illustrates a plot in which "resistance between first and second electrode layers×mesa lower portion area" is plotted against "distance x" for the produced infrared light-receiving elements. Since diode resistance is inversely proportional to diode area, "resistance between first and second electrode layers×mesa lower portion area" would be expected to take a constant value regardless of the distance x. However, it is clear from FIG. 20 that "resistance between first electrode layer and second electrode layer×mesa lower portion area" increases as the distance x increases. This is because as the distance x increases, this results in a larger resistance value when current flows in the substrate in-plane direction in the first reflecting layer. In a case in which the infrared optical device is an infrared light-receiving element, this resistance has an effect of reducing current extraction efficiency such that photoelectric current amplified through a resonance effect cannot be adequately extracted externally from the infrared light-receiving element. On the other hand, in a case in which the infrared optical device is an infrared light-emitting element, this resistance has an effect of causing a current distribution in the substrate in-plane direction to arise in the light-emitting layer such that an adequate resonance effect cannot be achieved. Accordingly, in order to realize a high light emission/reception characteristic in the infrared optical device of the present embodiment, it is more preferable that the mesa structure is formed within a range of 50 μm from the n-contact region that is formed on the second region of the first reflecting layer. It is more preferable that the mesa structure is formed within a range of 30 μm from this n-contact region.

Although embodiments have been described above based on the various drawings and examples, it should be noted that a person of ordinary skill in the art could easily make various modifications and revisions based on the present disclosure. Accordingly, such modifications and revisions should also be considered to be included within the scope of the present disclosure. For example, functions and the like included in various members, various means, etc., can be rearranged so long as they are logically consistent. Moreover, a plurality of means, etc., can be combined as one or can be split up.

The invention claimed is:

1. An infrared optical device that has a light emission/reception characteristic having a peak at a center wavelength λ, the infrared optical device comprising:
   a semiconductor substrate; and
   a thin film laminate portion including a first reflecting layer, an active layer, a p-type semiconductor layer, and a first electrode layer formed on the semiconductor substrate in stated order, wherein
   the first reflecting layer and the p-type semiconductor layer are directly connected to the active layer,
   the first reflecting layer is constructed through layering of a low-refractive-index layer that is an n-type semiconductor layer and a high-refractive-index layer having a higher refractive index than the low-refractive-index layer,
   the low-refractive-index layer is placed closest to the active layer in the first reflecting layer,
   the active layer and the p-type semiconductor layer each have a higher refractive index than the low-refractive-index layer, and the center wavelength λ is 7 μm or more at room temperature.

2. The infrared optical device according to claim 1, wherein the active layer is formed of InAsSb, where 0≤As<0.5.

3. The infrared optical device according to claim 1, wherein the active layer has a film thickness of not less than 1 μm and not more than 3 μm.

4. The infrared optical device according to claim 1, wherein the first reflecting layer includes a plurality of layers formed of AlGaInAsSb, where 0≤Al+Ga≤0.5 and 0≤As≤0.5, and having different impurity concentrations.

5. The infrared optical device according to claim 4, wherein the low-refractive-index layer includes an n-type semiconductor layer having an impurity concentration of $3.0 \times 10^{18}/cm^3$ or more.

6. The infrared optical device according to claim 4, wherein the first reflecting layer is a laminate of not fewer than 2 layers and not more than 6 layers.

7. The infrared optical device according to claim 4, wherein, when $n_L$ is taken to be a refractive index of the low-refractive-index layer at the center wavelength λ and $n_H$ is taken to be a refractive index of the high-refractive-index layer at the center wavelength λ, the low-refractive-index layer has a film thickness of smaller than $\lambda/(4n_L)$ and the high-refractive-index layer has a film thickness of larger than $\lambda/(4n_H)$.

8. The infrared optical device according to claim 4, wherein at least a portion of the low-refractive-index layer has a smaller film thickness than the high-refractive-index layer.

9. The infrared optical device according to claim 4, wherein the thin film laminate portion further includes a second reflecting layer disposed between the semiconductor substrate and the first reflecting layer and formed of a different material from the first reflecting layer.

10. The infrared optical device according to claim 1, wherein, when m is taken to be an integer of 1 or more and $n_c$ is taken to be an effective refractive index of a multilayered portion disposed between the first reflecting layer and the first electrode layer at the center wavelength λ, the multilayered portion has a film thickness L satisfying $\lambda(1+2m)/(4n_c)<L<\lambda(2+2m)/(4n_c)$.

11. The infrared optical device according to claim 1, wherein the active layer has a film thickness that is 70% or more of a film thickness of a multilayered portion disposed between the first reflecting layer and the first electrode layer.

12. The infrared optical device according to claim 1, wherein the thin film laminate portion includes a tunnel junction layer, and the tunnel junction layer is located intermediately in the active layer.

13. The infrared optical device according to claim 1, wherein
   the first reflecting layer includes a first region and a second region,
   the first region, the active layer, and the p-type semiconductor layer constitute a mesa structure,
   the mesa structure is covered by an insulating film such that part of an upper surface of the mesa structure is open to thereby form an opening,
   the first electrode layer is formed such as to cover the opening, and
   when $t_i$ is taken to be a film thickness of the insulating film present between the upper surface of the mesa structure and the first electrode layer, $n_i$ is taken to be a refractive index of the insulating film at the center wavelength λ, L is taken to be a film thickness of a multilayered portion disposed between the first reflecting layer and the first electrode layer, and $n_c$ is taken to be an effective refractive index of the multilayered portion at the center wavelength $\lambda$, there is an optical film thickness relationship of $t_i n_i < 0.03 \times L n_c$.

14. The infrared optical device according to claim 13, wherein the opening has an area that is 40% or more of a lower portion area of the mesa structure.

15. The infrared optical device according to claim 13, wherein an n-contact region for connecting the first reflecting layer and a second electrode layer is formed on the second region, and the mesa structure is formed within a range of 50 μm from the n-contact region.

* * * * *